United States Patent
Hayashi

(10) Patent No.: US 7,519,122 B2
(45) Date of Patent: Apr. 14, 2009

(54) OFDM RECEPTION APPARATUS AND OFDM RECEPTION METHOD

(75) Inventor: Takaya Hayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 611 days.

(21) Appl. No.: 10/570,769

(22) PCT Filed: May 9, 2005

(86) PCT No.: PCT/JP2005/008431

§ 371 (c)(1),
(2), (4) Date: Mar. 7, 2006

(87) PCT Pub. No.: WO2005/109712

PCT Pub. Date: Nov. 17, 2005

(65) Prior Publication Data

US 2007/0036232 A1    Feb. 15, 2007

(30) Foreign Application Priority Data

May 7, 2004  (JP)  ............................ 2004-138195

(51) Int. Cl.
*H04K 1/10*   (2006.01)
*H04B 1/10*   (2006.01)
(52) U.S. Cl. ...................... 375/260; 375/350
(58) Field of Classification Search .............. 375/260, 375/267, 285, 316, 340, 342–343, 346, 348, 375/350; 370/208, 210
See application file for complete search history.

(56) References Cited

U.S. PATENT DOCUMENTS 5,519,730 A * 5/1996 Jasper et al. ................ 375/260

(Continued)

FOREIGN PATENT DOCUMENTS

JP    H10-75226 A    3/1998

(Continued)

OTHER PUBLICATIONS

Chihiro Fujita et al., "MC-CDMA Nobori Kaisen ni Okeru MMSE Gosei o Mochiita Multi User Kansho Yokuatsu," The Institute of Electronics, Information and Communication Engineers Gijutsu Kenkyu Hokoku, RCS2001-177, Nov. 20, 2001, pp. 1-6.

*Primary Examiner*—Khanh C Tran
(74) *Attorney, Agent, or Firm*—McDermott Will & Emery LLP

(57) ABSTRACT

Precision of channel estimation is improved. An OFDM reception apparatus for receiving and demodulating an OFDM signal which transmits a pilot signal, comprises a channel estimation section for calculating a channel response before interpolation by performing computation between a frequency-domain OFDM signal and the pilot signal, performing interpolation with respect to the before-interpolation channel response using a plurality of filters having different characteristics from each other, and outputting a plurality of interpolated channel responses based on respective results of the interpolation obtained by the plurality of filters, an equalization section for performing waveform equalization with respect to the frequency-domain OFDM signal based on the plurality of interpolated channel responses, and outputting a plurality of demodulated signals based on respective results of the waveform equalization corresponding to the plurality of interpolated channel responses, a determination section for determining one having best quality from the plurality of demodulated signals, and outputting a result of the determination, and a selection section for selecting and outputting one of the plurality of demodulated signals in accordance with the determination result.

17 Claims, 16 Drawing Sheets

U.S. PATENT DOCUMENTS

| | | | |
|---|---|---|---|
| 6,178,194 B1 * | 1/2001 | Vasic | 375/136 |
| 6,219,334 B1 | 4/2001 | Sato et al. | |
| 7,209,433 B2 * | 4/2007 | Scarpa | 370/206 |
| 7,436,759 B2 * | 10/2008 | Hayashi et al. | 370/208 |
| 2005/0105647 A1 * | 5/2005 | Wilhelmsson et al. | 375/316 |
| 2006/0222099 A1 * | 10/2006 | Varadarajan et al. | 375/260 |
| 2007/0036231 A1 * | 2/2007 | Ido | 375/260 |

FOREIGN PATENT DOCUMENTS

| | | |
|---|---|---|
| JP | H10-257013 A | 9/1998 |
| JP | H11-163822 A | 6/1999 |
| JP | 2000-59267 A | 2/2000 |
| JP | 2001-189768 A | 7/2001 |
| JP | 2005-045628 A | 2/2005 |

* cited by examiner

FIG. 6
(a)
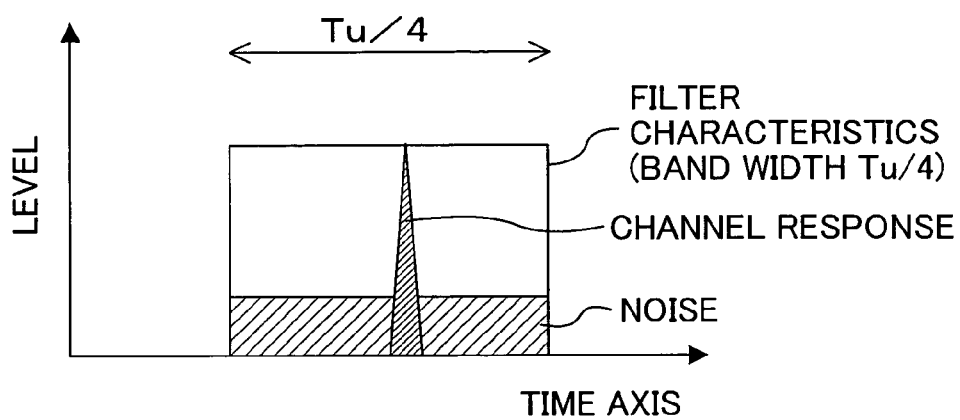
(b)
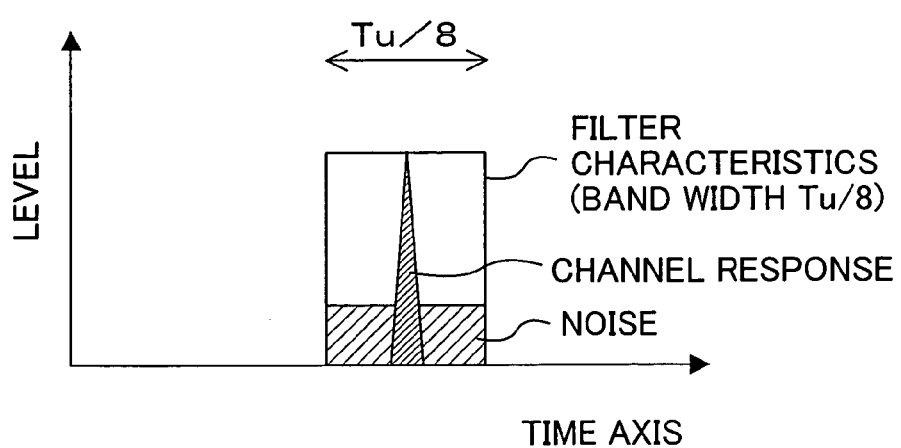

FIG. 7
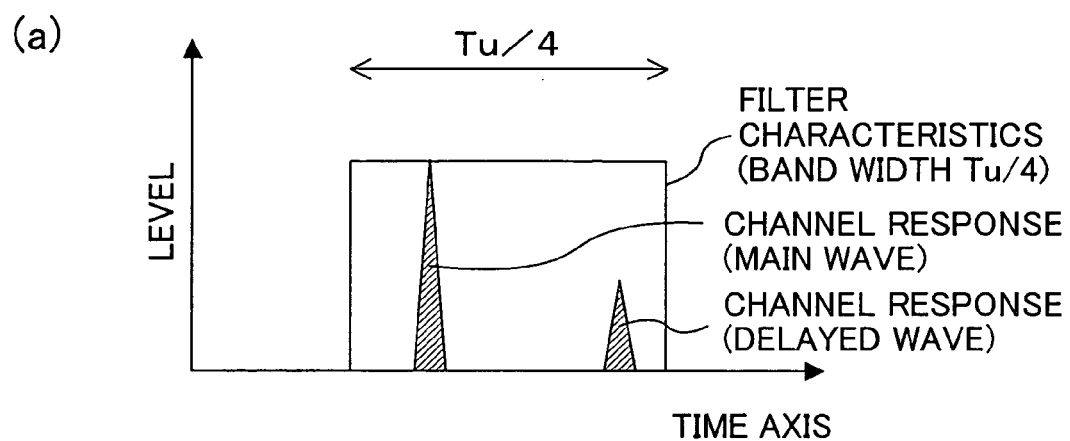
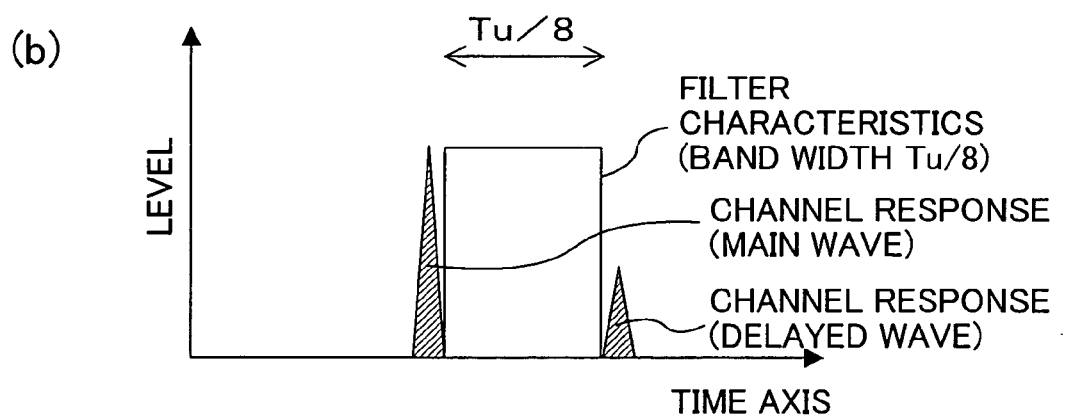

OFDM RECEPTION APPARATUS AND OFDM RECEPTION METHOD

RELATED APPLICATION

This application is the U.S. National Phase under 35 U.S.C. § 371 of International Application No. PCT/JP2005/008431, filed on May 9, 2005, which in turn claims the benefit of Japanese Application No. 2004-138195, filed on May 7, 2004, the disclosures of which Application are incorporated by reference herein.

TECHNICAL FIELD

The present invention relates to an apparatus and a method of receiving a signal which is modulated using an Orthogonal Frequency Division Multiplexing (OFDM) technique and is transmitted.

BACKGROUND ART

OFDM is used as a transmission technique for digital terrestrial broadcasting in Europe and Japan, wireless LAN, and the like. The OFDM technique is a method of performing modulation/demodulation by assigning data to a plurality of carriers orthogonal to each other. An Inverse Fast Fourier Transform (IFFT) process is performed in a transmitter, while a Fast Fourier Transform (FFT) process is performed in a receiver. Any modulation method can be applied to each carrier, including QPSK (Quaternary Phase Shift Keying), QAM (Quadrature Amplitude Modulation), and the like.

Generally, in apparatuses receiving digital terrestrial broadcasting, frequency characteristics of a transmission channel (channel response) is estimated based on a pilot signal inserted in a received OFDM signal, and the estimated channel response is used to perform waveform equalization.

An exemplary technique concerning such channel response estimation and waveform equalization is described in Patent Document 1 below. In Patent Document 1, a received pilot signal is separated from an OFDM signal which has been converted into a frequency domain signal by an FFT circuit, and is divided by a known pilot signal to obtain the channel response of a carrier which transmits the received pilot signal. Further, the channel response is smoothed in a time direction by a symbol filter, i.e., interpolation is performed between symbols, and thereafter, interpolation is performed between carriers by an interpolation circuit, to obtain a channel response H(l, kd). A received data signal Y(l, kd) is divided by the channel response H(l, kd) to obtain equalized data X(l, kd).

When a channel response is estimated by performing interpolation between symbols and between carriers using a filter in this manner, noise overlaps the estimated channel response. A power of the noise (noise power) increases with an increase in pass band width of a filter for interpolation between carriers, and decreases with a decrease in the pass band width. Therefore, in order to remove an influence of the noise to improve the precision of channel estimation, it is effective to narrow the pass band width of the filter.

According to the transmission standards for digital terrestrial television broadcasting in Europe and Japan, any one of Tu/4, Tu/8, Tu/16, and Tu/32 (Tu: effective symbol duration) is adopted as a guard interval so as to transmit an OFDM signal. In a receiver, a delay time of multipath interference which can be removed is determined, depending on the guard interval. For example, when the guard interval is Tu/4, a main wave can be received while removing an influence of a delayed wave having a delay time of Tu/4 or less. Therefore, in order to remove the multipath influence to improve channel estimation precision, it is effective to widen the pass band width of the filter.

Therefore, in the interpolation circuit described in Patent Document 1, a guard interval is determined from a received OFDM signal, and based on the determined guard interval, a coefficient of a filter which is used to perform interpolation between carriers (hereinafter referred to as a "carrier filter") in the interpolation circuit is controlled so that pass band widths of the filter are switched. Specifically, when the guard interval is long, the filter coefficient is set so as to widen the pass band width. When the guard interval is short, the filter coefficient is set so as to narrow the pass band width.

As described above, in the interpolation circuit, the band widths of the filter for interpolation are switched so as to fit the guard interval, thereby suppressing and reducing a noise component overlapping the estimated channel response.

Patent Document 1: Japanese Patent Unexamined Publication No. 11-163822

DISCLOSURE OF THE INVENTION

Problems to be Solved by the Invention

In the case where the pass band width of a carrier filter is controlled based on a guard interval as described above, a carrier filter having a widest pass band width when a transmission channel is estimated, is used in order to receive an OFDM signal whose guard interval is Tu/4. In this case, the effect of suppressing and reducing a noise component of a carrier filter becomes minimum, so that the channel estimation precision is significantly deteriorated.

For example, in the case where an OFDM signal whose guard interval is Tu/8 is received, if a delayed wave whose delay time exceeds Tu/8 is present, the delay time exceeds the pass band width (Tu/8) of the filter, so that a channel response cannot be estimated.

When the estimation precision of the channel response thus obtained is low, demodulation cannot be correctly performed, so that OFDM signal reception performance is significantly deteriorated.

An object of the present invention is to improve channel estimation precision when receiving an OFDM signal.

SOLUTION TO THE PROBLEMS

The present invention is directed to an OFDM reception apparatus of receiving and demodulating an OFDM (Orthogonal Frequency Division Multiplexing) signal which transmits a pilot signal whose amplitude and phase are known. The apparatus calculates a channel response before interpolation based on the received OFDM signal, performs interpolation with respect to the before-interpolation channel response using a plurality of filters having different characteristics from each other to obtain a plurality of interpolated channel responses, and uses one which provides a high-quality demodulated signal among the plurality of interpolated channel responses to obtain a demodulated signal.

Specifically, the present invention is directed to an OFDM reception apparatus for receiving and demodulating an OFDM signal which transmits a pilot signal whose amplitude and phase are known. The apparatus comprises a channel estimation section for calculating a channel response before interpolation by performing computation between a frequency-domain OFDM signal obtained by Fourier-transforming the received OFDM signal and the pilot signal, performing interpolation with respect to the before-interpolation channel response using a plurality of filters having different characteristics from each other, and outputting a plurality of interpolated channel responses based on respective results of the interpolation obtained by the plurality of filters, an equalization section for performing waveform equalization with respect to the frequency-domain OFDM signal based on the plurality of interpolated channel responses, and outputting a plurality of demodulated signals based on respective results of the waveform equalization corresponding to the plurality of interpolated channel responses, a determination section for determining one having best quality from the plurality of demodulated signals, and outputting a result of the determination, and a selection section for selecting and outputting one of the plurality of demodulated signals in accordance with the determination result.

According to the present invention, among channel responses obtained from a plurality of filters having different characteristics, a channel response which provides a high-quality demodulated signal can be known. Thus, it is possible to improve channel estimation precision, thereby obtaining a demodulated signal having high quality.

EFFECT OF THE INVENTION

According to the present invention, when an OFDM signal is received, even if noise interference or multipath interference is present in the received signal, channel estimation precision or the quality of a demodulated signal can be improved, depending on an interference situation, without depending on a guard interval. As a result, it is possible to improve reception performance of an OFDM reception apparatus or the like.

BRIEF DESCRIPTION OF THE DRAWINGS

FIGS. 6(a) and 6(b) are diagrams illustrating a channel response obtained by a wide-band filter and a channel response obtained by a narrow-band filter, respectively, under environment of Gaussian noise interference.

FIGS. 7(a) and 7(b) are diagrams illustrating a channel response obtained by a wide-band filter and a channel response obtained by a narrow-band filter, respectively, under environment of multipath interference.

DESCRIPTION OF THE REFERENCE CHARACTERS

| | |
|---|---|
| 16, 17, 17A, 17B, 416, 417, 516, 517 | delay section |
| 19, 319, 419, 519 | selection section |
| 20, 220, 320 | channel estimation section |
| 40, 42 | symbol interpolating section |
| 43, 51, 351 | wide-band filter |
| 44, 52. 352 | narrow-band filter |
| 50, 53, 54, 350, 453 | carrier interpolating section |
| 60, 360, 460 | equalization section |
| 70, 670 | noise removing section |
| 71, 671 | IFFT section |
| 72, 672 | zero replacement section |
| 73, 673 | FFT section |
| 74, 674 | end portion replacement section |
| 80, 380, 480 | determination section |
| 81, 82, 82A, 82B | quality detecting section |
| 83,383 | comparison section |
| 463 | division section |
| 583 | difference detecting section |

BEST MODE FOR CARRYING OUT THE INVENTION

Hereinafter, embodiments of the present invention will be described in detail with reference to the accompanying drawings.

Figure 1:
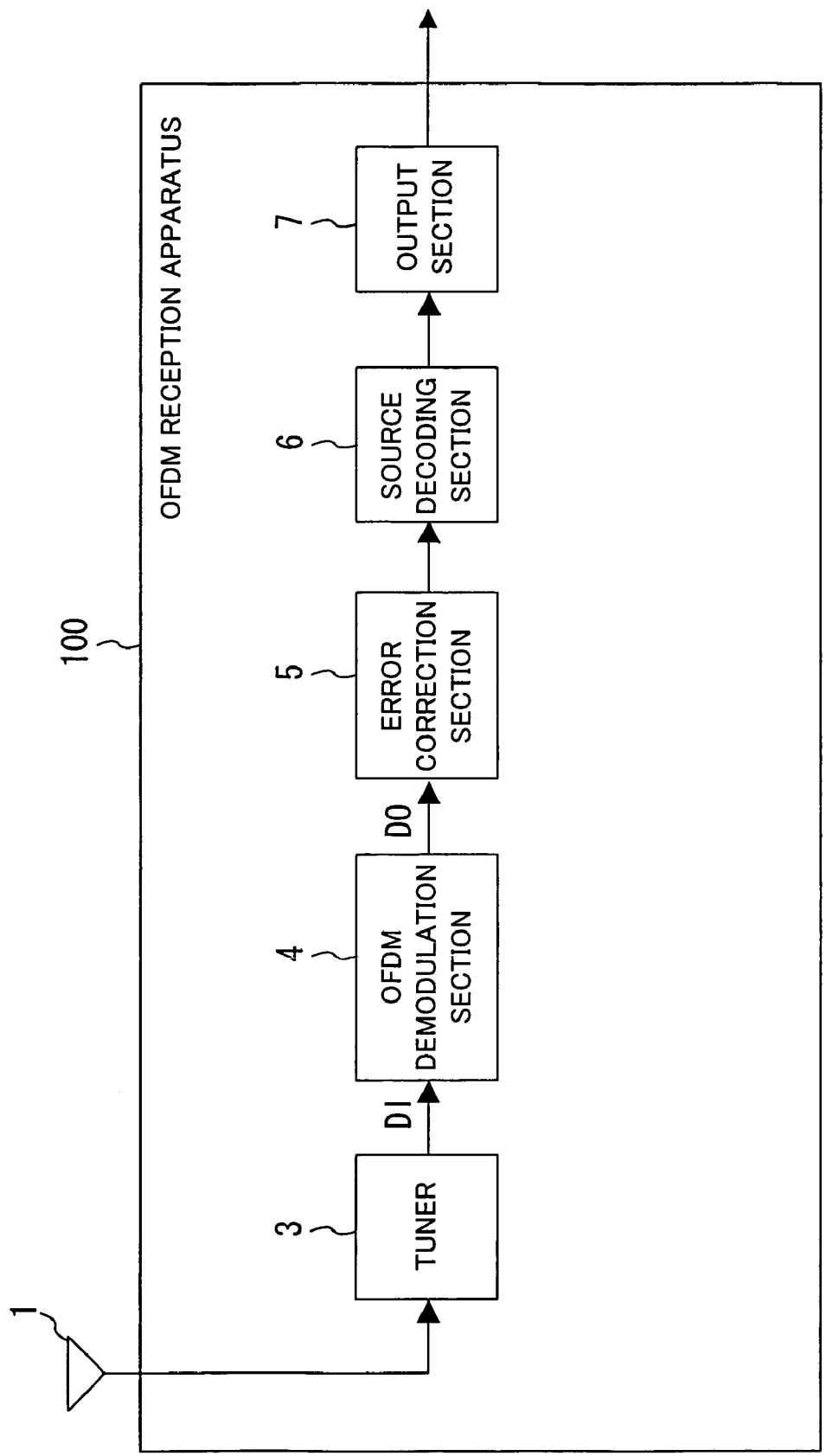
FIG. 1 is a block diagram illustrating an exemplary example of an OFDM reception apparatus according to an embodiment of the present invention.

FIG. 1 is a block diagram illustrating an exemplary example of an OFDM reception apparatus according to an embodiment of the present invention. The OFDM reception apparatus 100 of FIG. 1 comprises a tuner 3, an OFDM demodulation section 4, an error correction section 5, a source decoding section 6, and an output section 7.

In FIG. 1, a signal received by an antenna 1 is supplied to the tuner 3 in the OFDM reception apparatus 100. The tuner 3 subjects the received signal thus supplied to extraction of an OFDM signal containing a desired service, frequency conversion from an RF (Radio Frequency) band to an IF (Intermediate Frequency) band, gain adjustment, and the like, and outputs results of these processes to the OFDM demodulation section 4. The OFDM demodulation section 4 demodulates a signal DI supplied from the tuner section 3 based on frequency characteristics of a transmission channel (channel response), and output a demodulation result DO to the error correction section 5.

The error correction section 5 restores transmitted digital data from the demodulation result DO of the OFDM demodulation section 4, corrects a transmission error caused by, for example, external perturbation applied to the transmission channel, using Viterbi decoding, Reed-Solomon decoding, or the like, and outputs the result to the source decoding section 6. The source decoding section 6 separates the output of the error correction section 5 into data, such as video, audio, and the like, and thereafter, subjects the separated data to a data decompression process, and outputs the result to the output section 7. Of the outputs of the source decoding section 6, the output section 7 displays video information on a CRT (Cathode Ray Tube) or the like, outputs audio information via a loudspeaker, and the like, to provide a desired service to the user. Also, the output section 7 can output an output of the source decoding section to an external apparatus.

Hereinafter, various examples of the OFDM demodulation section will be described.

First Embodiment

Figure 2:
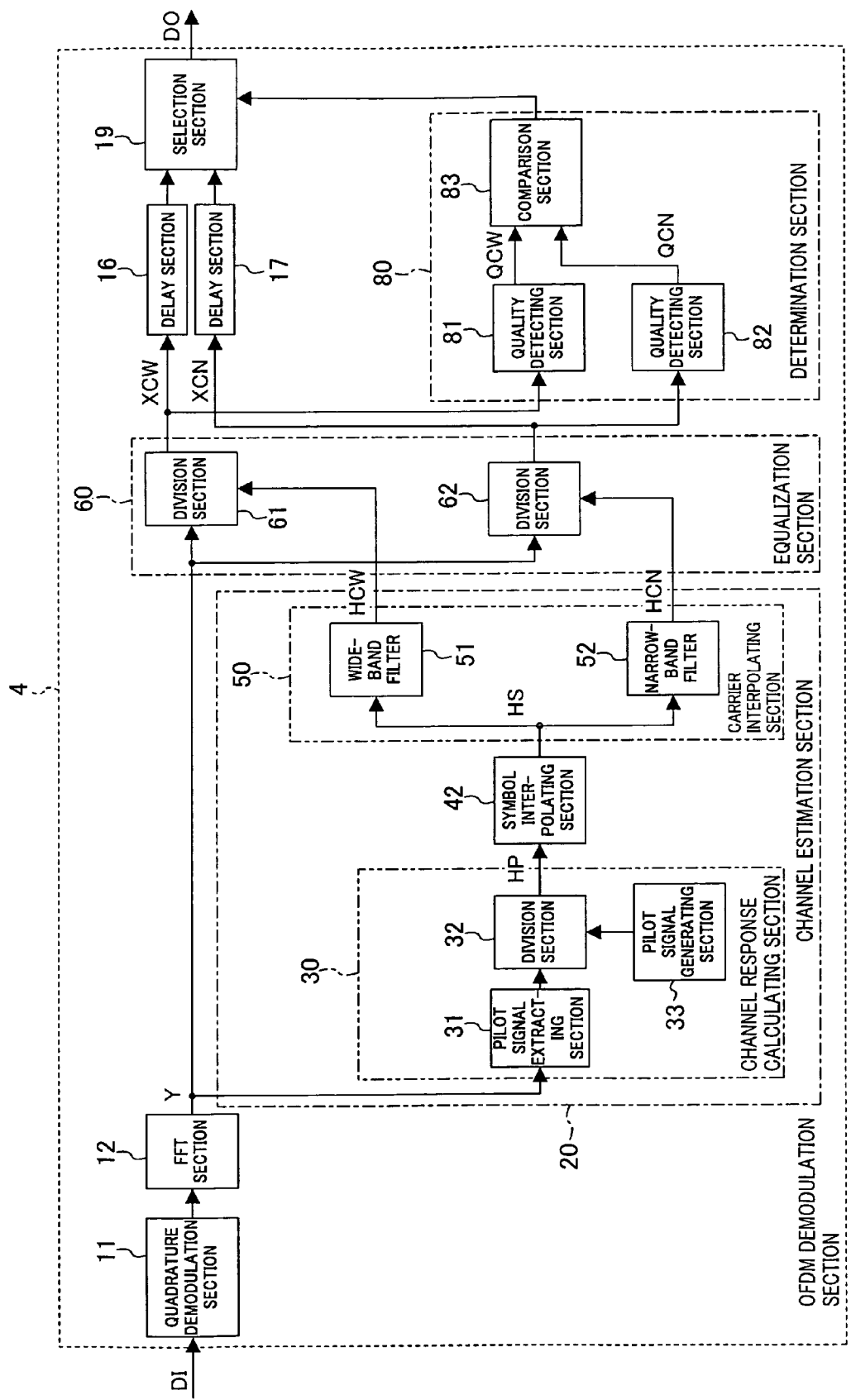
FIG. 2 is a block diagram illustrating an exemplary structure of an OFDM demodulation section according to a first embodiment of the present invention.

FIG. 2 is a block diagram illustrating an exemplary structure of an OFDM demodulation section 4 according to a first embodiment of the present invention. The OFDM demodulation section 4 comprises a quadrature demodulation section 11, an FFT section 12, a channel estimation section 20, an equalization section 60, a determination section 80, delay sections 16 and 17, and a selection section 19.

The quadrature demodulation section 11 performs quadrature demodulation to frequency-convert an output of the tuner 3 of FIG. 1 from a signal in an IF band into a signal in a base band, and outputs the result to the FFT section 12. In this case, the output of the tuner 3, which is a real signal, is converted into a complex signal consisting of an I (In Phase) axis component and a Q (Quadrature Phase) axis component.

The FFT section 12 converts an output of the quadrature demodulation section 11 from an OFDM signal in a time domain into an OFDM signal in a frequency domain, and outputs the resultant frequency-domain OFDM signal Y to the channel estimation section 20 and the equalization section 60. The frequency-domain OFDM signal Y output from the FFT section 12 indicates a phase and an amplitude of each carrier of an OFDM signal, and specifically, is represented by a complex signal having an I-axis direction level and a Q-axis direction level independently.

The channel estimation section 20 employs a plurality of filters having different characteristics from each other for interpolation so as to estimate a plurality of frequency characteristics of a transmission channel (channel responses) through which a received OFDM signal is transmitted, and comprises a channel response calculating section 30, a symbol interpolating section 42, and a carrier interpolating section 50.

The channel response calculating section 30 has a pilot signal extracting section 31, a division section 32, and a pilot signal generating section 33. The carrier interpolating section 50 has a wide-band filter 51 and a narrow-band filter 52 as carrier interpolating filters. The equalization section 60 comprises division sections 61 and 62. The determination section 80 comprises quality detecting sections 81 and 82 and a comparison section 83.

An operation of the thus-constructed OFDM demodulation section 4 according to the first embodiment of the present invention will be described in detail.

Figure 3:
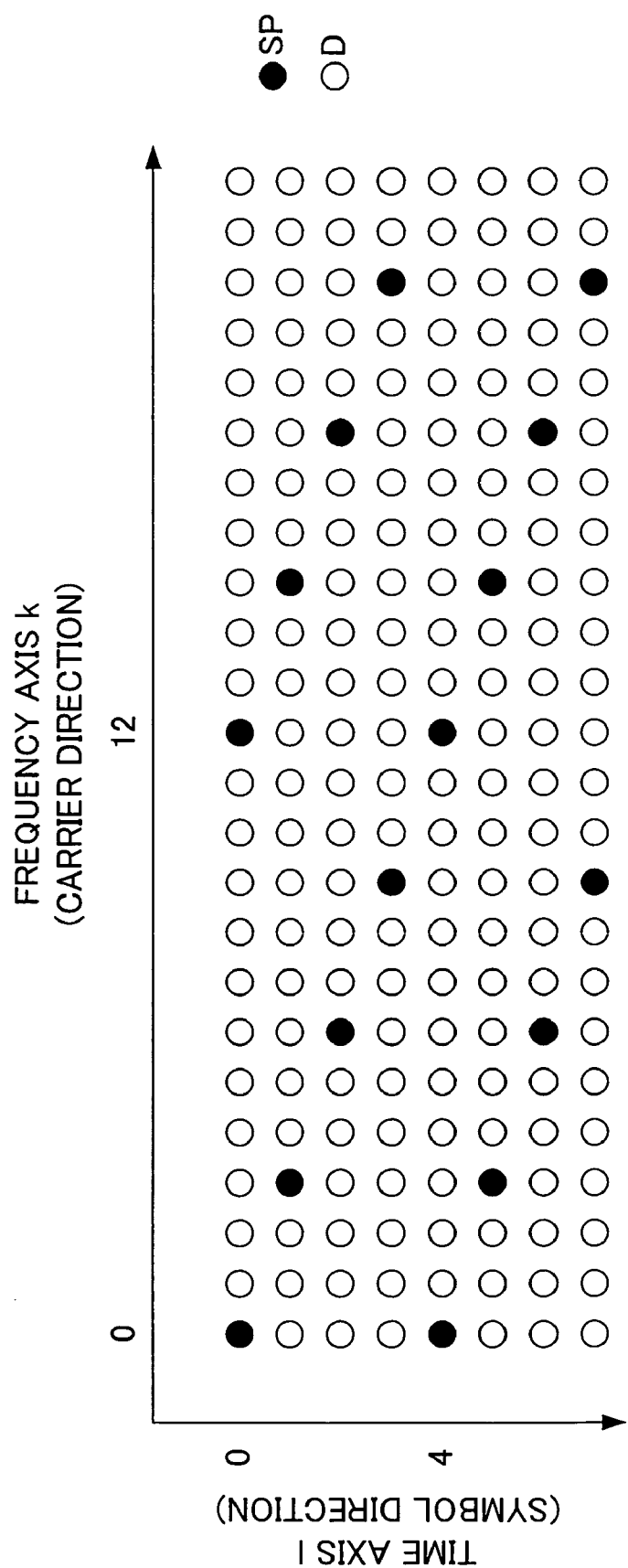
FIG. 3 is a diagram illustrating an exemplary arrangement format of a pilot signal in an OFDM signal received by the OFDM reception apparatus of FIG. 1.

FIG. 3 is a diagram illustrating an exemplary arrangement format of a pilot signal in an OFDM signal received by the OFDM reception apparatus of FIG. 1. Specifically, FIG. 3 illustrates the arrangement format of a pilot signal for the digital terrestrial broadcasting system (DVB-T) in Europe, the digital terrestrial broadcasting system (ISDB-T) in Japan, and the like.

In FIG. 3, the horizontal axis (frequency axis) k indicates a carrier index, and the vertical axis (time axis) l indicates a symbol index. A closed circle indicates a pilot signal (SP (Scattered Pilot)), and an open circle indicates a data signal (D) containing control information and additional information. As used herein, the control information is TPS (Transmission Parameter Signaling) in DVB-T or TMCC (Transmission Multiplexing Configuration Control) in ISDB-T, and the additional information is AC (Auxiliary Channel) in ISDB-T.

In FIG. 3, a pilot signal indicated with a closed circle is provided every 12 carriers in each symbol, and is shifted by 3 carriers every symbol. The pilot signal is modulated based on a pseudo-random binary sequence, and an amplitude and a phase thereof are determined only by the index k of a provided carrier, without depending on the index l of a symbol.

The pilot signal extracting section 31 extracts a pilot signal from a frequency-domain OFDM signal supplied from the FFT section 2, and outputs the pilot signal to the division section 32. The pilot signal generating section 33 generates a predetermined pilot signal (SP signal in ISDB-T and DVB-T) whose amplitude and phase are known and which corresponds to the pilot signal supplied from the pilot signal extracting section 31 to the division section 32, and outputs the predetermined pilot signal to the division section 32.

The division section 32 divides the pilot signal supplied from the pilot signal extracting section 31 by the pilot signal supplied from the pilot signal generating section 33 to calculate frequency characteristics of a transmission channel for a carrier transmitting the pilot signal (hereinafter referred to as a pilot carrier), i.e., a channel response HP, and outputs the channel response HP to the symbol interpolating section 42. The channel response HP is obtained as a channel response before interpolation with respect to a position at which a pilot signal SP is inserted in FIG. 3.

The symbol interpolating section 42 subjects the channel response HP supplied from the division section 32 to symbol-direction (time axis-direction) filtering (band limitation) to perform interpolation between symbols, and outputs a resultant channel response HS to the wide-band filter 51 and the narrow-band filter 52.

Figure 4:
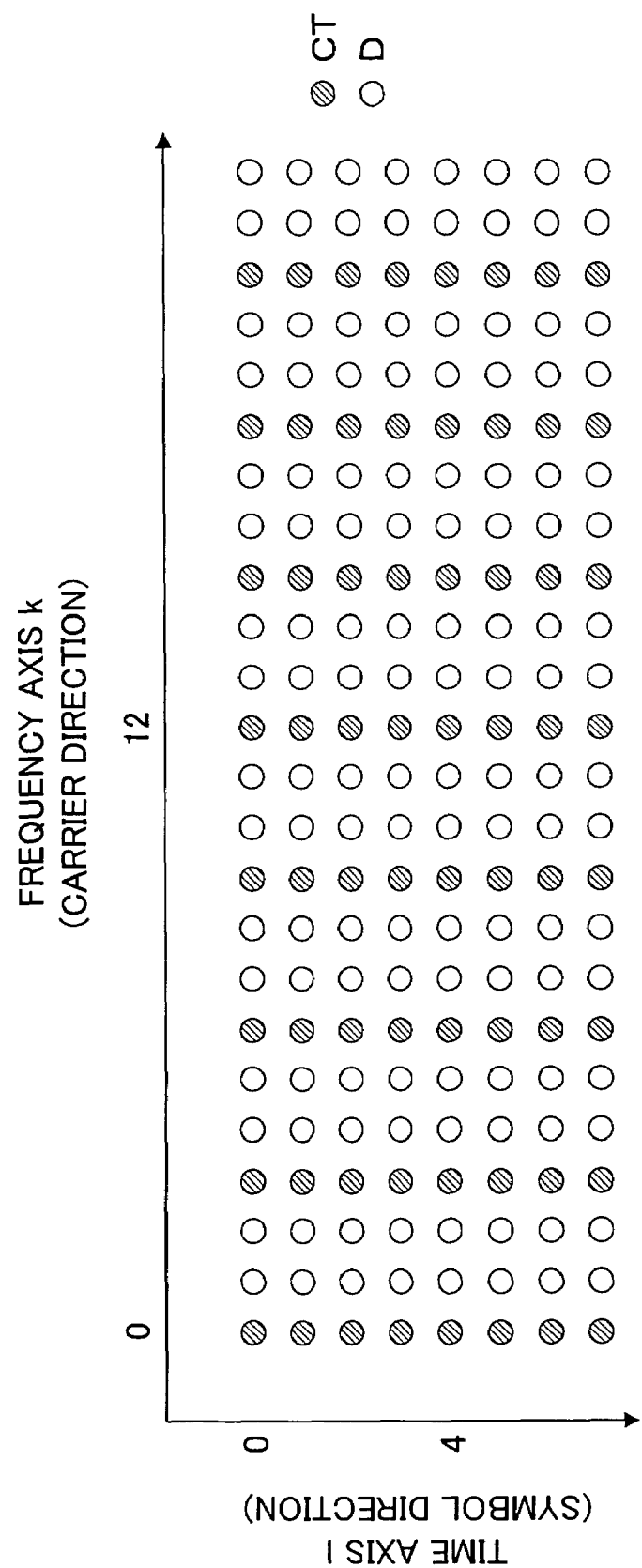
FIG. 4 is a diagram illustrating positions at which channel responses interpolated in a symbol direction by the symbol interpolating section of FIG. 2 are obtained.

FIG. 4 is a diagram illustrating positions at which channel responses interpolated in the symbol direction by the symbol interpolating section 42 of FIG. 2 are obtained. As illustrated in FIG. 4, the interpolated channel response HS is obtained at positions indicated by symbol CT.

The wide-band filter 51 and the narrow-band filter 52 of the carrier interpolating section 50 have different characteristics from each other. The wide-band filter 51 and the narrow-band filter 52 each subject the channel response HS supplied from the symbol interpolating section 42 to carrier-direction (frequency axis-direction) filtering (band limitation) to perform interpolation between carriers. The wide-band filter 51 outputs a resultant channel response HCW to the division section 61, and the narrow-band filter 52 outputs a resultant channel response HCN to the division section 62.

Figure 5:
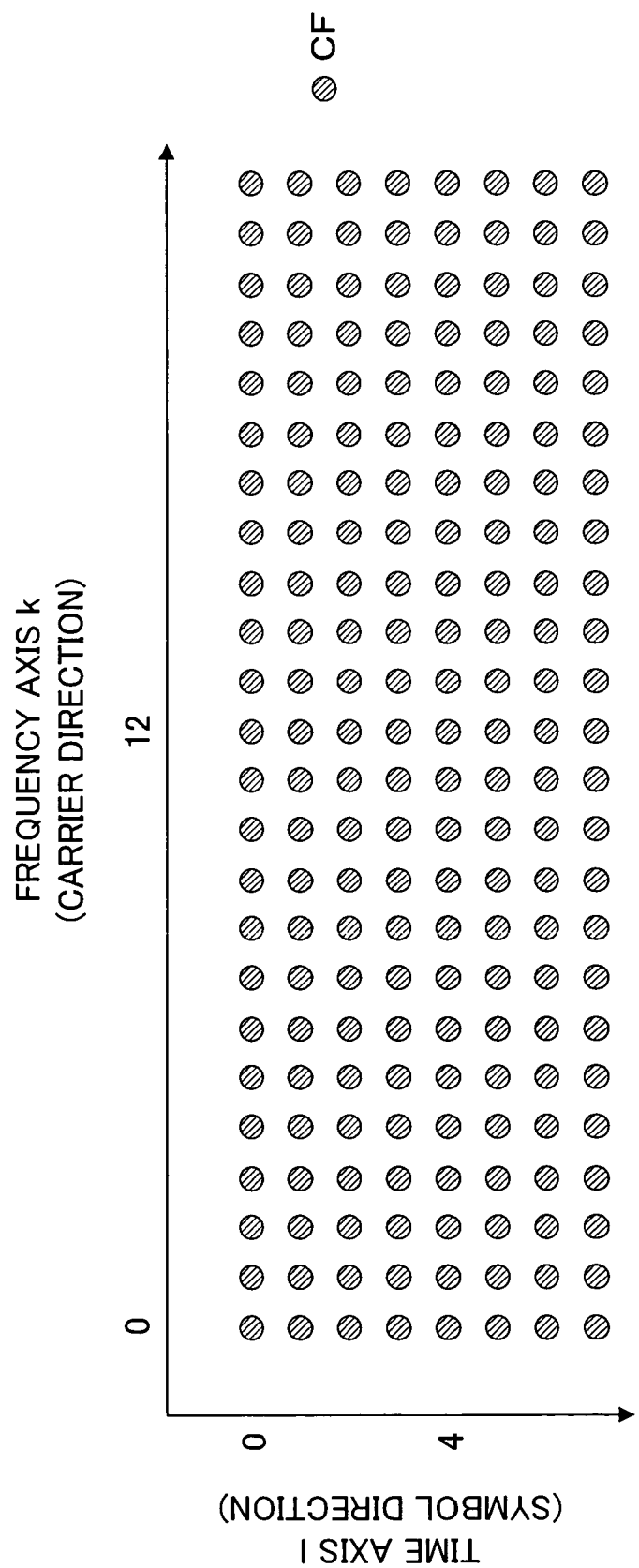
FIG. 5 is a diagram illustrating positions at which channel responses interpolated in a carrier direction by a wide-band filter and a narrow-band filter of FIG. 2 are obtained.

FIG. 5 is a diagram illustrating positions at which channel responses interpolated in the carrier direction by the wide-band filter 51 and the narrow-band filter 52 of FIG. 2 are obtained. As illustrated in FIG. 5, the interpolated channel responses HCW and HCN are both obtained at positions indicated by symbol CF.

The wide-band filter 51 and the narrow-band filter 52 are each composed of an FIR filter. Note that the wide-band filter 51 and the narrow-band filter 52 have different characteristics (i.e., pass bands) from each other, and in the first embodiment, it is assumed that the wide-band filter 51 has a pass band width of Tu/4 and the narrow-band filter 52 has a pass band width of Tu/8.

FIGS. 6(a) and 6(b) are diagrams illustrating a channel response obtained by the wide-band filter 51 and a channel response obtained by the narrow-band filter 52, respectively, under environment of Gaussian noise (hereinafter simply referred to as noise) interference. In FIGS. 6(a) and 6(b), the vertical axis indicates a signal level (signal power) and the horizontal axis indicates time, and channel responses and noise which pass through the wide-band filter 51 and the narrow-band filter 52 are converted into time-axis responses, which are illustrated.

As illustrated in FIG. 6, a channel response has a shape having a peak, while noise overlapping the channel response is distributed evenly over the time axis. The amount of noise passing through the narrow-band filter 52 is smaller than the amount of noise passing through the wide-band filter 51. Therefore, when an OFDM signal is received under environment in which noise interference is present, the narrow-band filter 52 obtains a higher level of channel estimation precision than that which is obtained by the wide-band filter 51.

FIGS. 7(a) and 7(b) are diagrams illustrating a channel response obtained by the wide-band filter 51 and a channel response obtained by the narrow-band filter 52, respectively, under environment of multipath noise interference. In FIGS. 7(a) and 7(b), the vertical axis indicates a signal level and the horizontal axis indicates time, and channel responses which pass through the wide-band filter 51 and the narrow-band filter 52 are converted into time-axis responses, which are illustrated.

As illustrated in FIG. 7, when a delay time of a delayed wave with respect to a main wave exceeds the pass band width Tu/8 of the narrow-band filter 52, channel responses of the main wave and the delayed wave can both pass through the wide-band filter 51, but are interrupted by the narrow-band filter 52 and cannot pass therethrough. Therefore, when an OFDM signal is received under environment of multipath interference in which a delayed wave having a long delay time exceeding the pass band width of a filter occurs, the wide-band filter 51 obtains a higher level of channel estimation precision than that which is obtained by the narrow-band filter 52.

As described above, a difference in estimation precision may occur between the channel responses HCW and HCN obtained by the wide-band filter 51 and the narrow-band filter 52, respectively, due to an interference factor, such as noise or multipath.

The division section 61 divides the frequency-domain OFDM signal Y supplied from the FFT section 12 by the channel response HCW, and outputs a resultant demodulated signal XCW to the delay section 16 and the quality detecting section 81. The division section 62 divides the frequency-domain OFDM signal Y supplied from the FFT section 12 by the channel response HCN, and outputs a resultant demodulated signal XCN to the delay section 17 and the quality detecting section 82. In other words, the division sections 61 and 62 compensate for waveform distortion which is caused due to multipath occurring in a transmission channel, by performing waveform equalization with respect to the frequency-domain OFDM signal Y.

Here, the two channel responses HCW and HCN obtained in the carrier interpolating section 50 have different estimation precisions, depending on the situation of interference (noise, multipath), and therefore, the demodulated signals XCW and XCN obtained in the division sections 61 and 62 based on these channel responses have different quality levels, depending on the interference situation.

The determination section 80 determines which of the demodulated signals XCW and XCN supplied from the division sections 61 and 62, respectively, has a higher level of quality (better quality). The determination section 80 will be described. The quality detecting section 81 detects a quality value QCW of the demodulated signal XCW, and outputs the detection result to the comparison section 83. The quality detecting section 82 detects a quality value QCN of the demodulated signal XCN, and outputs the detection result to the comparison section 83. The comparison section 83 compares the quality value QCW and the quality value QCN to determine one of them which has a higher level of quality, and outputs the determination result to the selection section 19.

Figure 8:
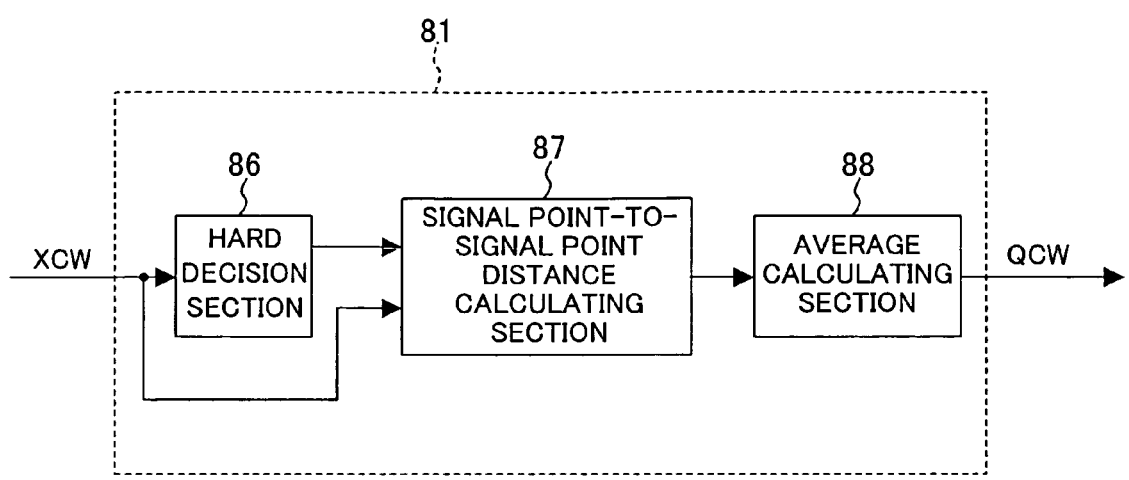
FIG. 8 is a block diagram illustrating an exemplary structure of a quality detecting section of FIG. 1.

FIG. 8 is a block diagram illustrating an exemplary structure of the quality detecting section 81 of FIG. 1. As illustrated in FIG. 8, the quality detecting section 81 comprises a hard decision section 86, a signal point-to-signal point distance calculating section 87, and an average calculating section 88. The quality detecting section 82 is assumed to have a structure similar to that of the quality detecting section 81.

The hard decision section 86 determines an ideal signal point which has a closest distance from a signal point on an I-Q plane of a carrier for the demodulated signal XCW, and outputs the ideal signal point as an ideal signal to the signal point-to-signal point distance calculating section 87. The signal point-to-signal point distance calculating section 87 calculates a signal point-to-signal point distance for each carrier based on the ideal signal output from the hard decision section 86, and the demodulated signal XCW.

Specifically, the signal point-to-signal point distance calculating section 87 calculates a square of a difference value between I-axis components and a square of a difference value between Q-axis components with respect to the ideal signal point on the I-Q plane indicated by the ideal signal and a signal point on the I-Q plane indicated by a demodulated signal, and calculates and outputs a sum of them as a signal point-to-signal point distance to the average calculating section 88.

The average calculating section 88 calculates an average value of signal point-to-signal point distances obtained over a plurality of carriers by the signal point-to-signal point distance calculating section 87. A period of time for which the average value is calculated may extend within one symbol or over a plurality of symbols. The longer the calculation period, the higher the detection precision of the quality of a demodulated signal. Conversely, if the calculation period is decreased, a time required to obtain the determination result in the determination section 80 decreases, so that the hardware amount of delayers in the delay sections 16 and 17 can be reduced.

With the thus-constructed determination section 80, the signal quality values QCW and QCN can be respectively calculated from the two demodulated signals XCW and XCN which have different quality levels, depending on an interference situation, and based on a result of comparison of the calculated quality values QCW and QCN, a demodulated signal having a higher level of quality can be determined.

The delay sections 16 and 17 delay the demodulated signals XCW and XCN, respectively, and output them to the selection section 19. The selection section 19 selects one of the demodulated signals XCW and XCN which has better quality in accordance with the determination result output from the determination section 80, and outputs the selection result as a demodulated signal DO to the error correction section 5.

Here, the delay sections 16 and 17 delay the demodulated signals XCW and XCN, respectively, by a time required for detection, comparison, and determination of a quality value in the determination section 80, for example. As a result, a difference is removed between timing of inputting the demodulated signals XCW and XCN to the selection section 19 and timing of inputting the determination result of these demodulated signals in the determination section 80 to the selection section 19. Therefore, even when the estimation precision situations of the two channel responses HCW and HCN output from the carrier interpolating section 50 are changed due to a change in the interference situation or the like, the OFDM demodulation section 4 can follow the change quickly and outputs an appropriate demodulated signal DO.

Note that the delay sections 16 and 17 may not be provided. In this case, it is possible to reduce circuit cost required for the delay sections 16 and 17.

Although, in the first embodiment of the present invention, the carrier interpolating section 50 is assumed to have two filters, the number of filters may be three or more. Also in such a case, waveform equalization may be performed with respect to a channel response obtained for each filter, and a demodulated signal having a highest level of quality may be selected from the resultant demodulated signals. Therefore, the quality precision of a demodulated signal can be more flexibly selected, depending on an interference situation, thereby making it possible to improve reception performance of the OFDM reception apparatus.

Also in the first embodiment of the present invention, the carrier interpolating section 50 is assumed to comprise a plurality of filters having different pass bands (pass band widths). Instead, the carrier interpolating section 50 may comprise a plurality of filters having the same pass band width, but pass bands shifted from each other (center positions of the pass bands are shifted from each other). For example, two filters having a pass band width of Tu/4 may be provided, one of the two filters having a pass band ranging from 0 to Tu/4 (the center position is Tu/2), and the other having a pass band ranging from −Tu/8 to +Tu/8 (the center position is 0). In this case, the quality precision of a demodulated signal can be more flexibly selected even in a multipath interference situation, which has various delay times, thereby making it possible to improve reception performance of the OFDM reception apparatus. Alternatively, a plurality of filters having different pass band widths and pass bands shifted from each other (the center positions of the pass bands are shifted from each other) may be provided.

Thus, the OFDM reception apparatus of the first embodiment of the present invention performs waveform equalization based on a channel response obtained for each of a plurality of filters having different characteristics (pass bands) when demodulating a received OFDM signal, and determines and selects one of a plurality of resultant demodulated signals which has best quality. Therefore, it is possible to improve the reception performance of the OFDM reception apparatus even in a situation in which any of the Gaussian noise interference and the multipath interference can occur, without depending on a guard interval.

Second Embodiment

Figure 9:
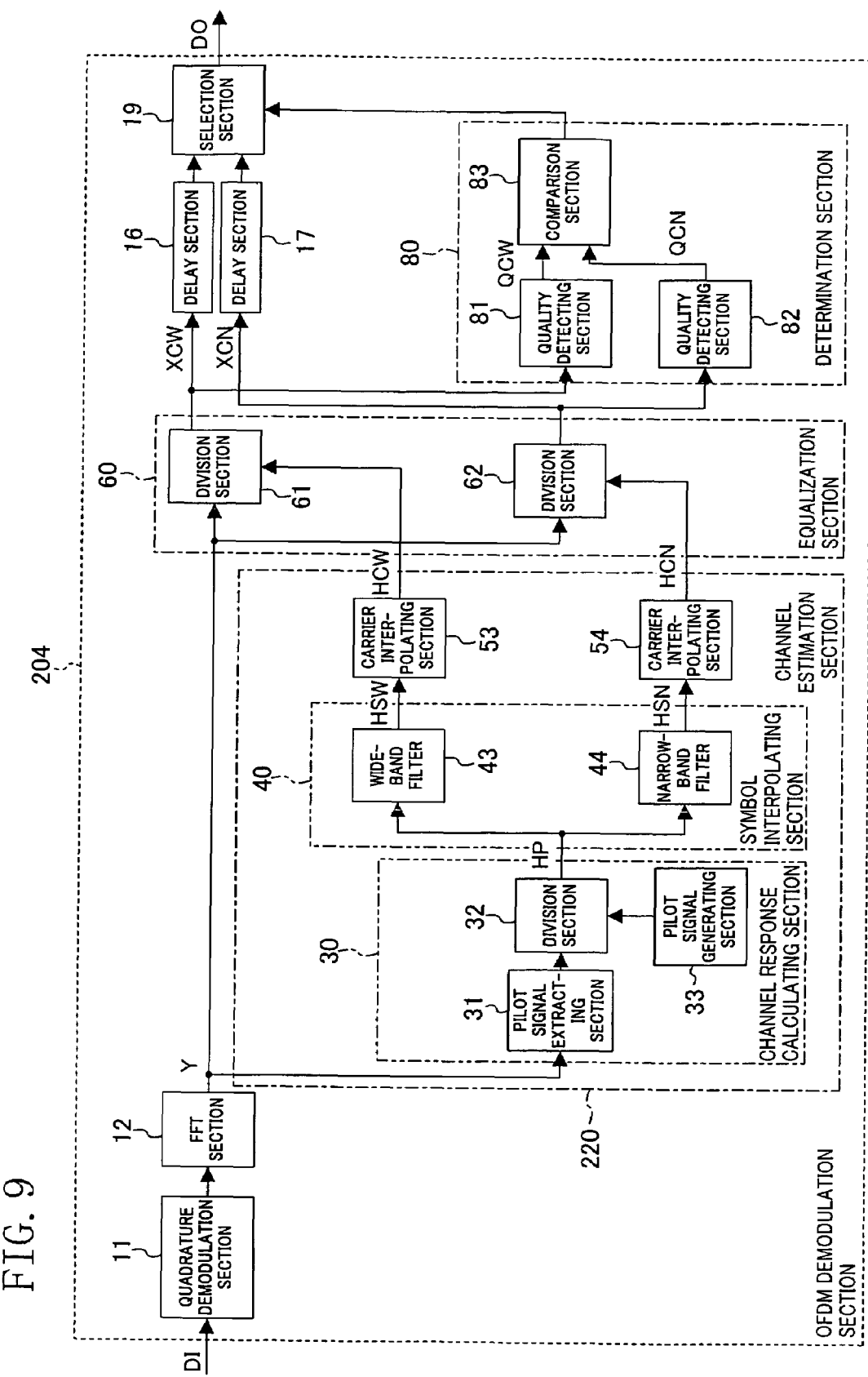
FIG. 9 is a block diagram illustrating an exemplary structure of an OFDM demodulation section according to a second embodiment of the present invention.

FIG. 9 is a block diagram illustrating an exemplary structure of an OFDM demodulation section 204 according to a second embodiment of the present invention. In the second embodiment, the OFDM demodulation section 204 is employed instead of the OFDM demodulation section 4, in the OFDM reception apparatus of FIG. 1. The OFDM demodulation section 204 of FIG. 9 is different from the OFDM demodulation section 4 of FIG. 2 in that a channel estimation section 220 is provided instead of the channel estimation section 20. The other components are similar to those which have been described with reference to FIG. 2 and are referenced with the same reference numerals, and will not be explained.

The channel estimation section 220 has a channel response calculating section 30, a symbol interpolating section 40, and carrier interpolating sections 53 and 54. The channel response calculating section 30 is similar to that which has been described with respect to FIG. 2.

The symbol interpolating section 40 comprises a wide-band filter 43 and a narrow-band filter 44 which have different characteristics from each other. These filters have different pass bands from each other. The wide-band filter 43 and the narrow-band filter 44 subject a channel response HP from a division section 32 to symbol-direction filtering to perform interpolation between symbols. The wide-band filter 43 outputs a resultant channel response HSW to the carrier interpolating section 53, and the narrow-band filter 44 outputs a resultant channel response HSN to the carrier interpolating section 54. The interpolated channel responses HSW and HSN are obtained at the positions indicated with symbol CT in FIG. 4.

Here, the wide-band filter 43 and the narrow-band filter 44 are each composed of an FIR filter. In the second embodiment of the present invention, the wide-band filter 43 is assumed to serve as a first-order interpolation filter and the narrow-band filter 44 is assumed to serve as a zeroth-order interpolation filter.

More specifically, the wide-band filter 43 performs linear interpolation with timing of symbols based on a channel response HP corresponding to a pilot signal obtained every 4 symbols. When a temporal variation in channel response is significant during mobile reception or the like (fading interference or the like), a relatively high level of channel estimation precision can be secured, though the effect of suppressing noise is relatively low, so that the estimation precision may be deteriorated during noise interference or the like.

On the other hand, the narrow-band filter 44 performs interpolation using an average value of channel responses HP corresponding to pilot signals inserted into symbols before and after a received symbol, so that the pass band width is narrower than that of the wide-band filter 43. Therefore, when a temporal variation in channel response is large during fading interference or the like, channel estimation precision is deteriorated, however, since the effect of suppressing noise is relatively high, a relatively high level of estimation precision can be secured during noise interference.

As described above, a difference in estimation precision may occur in the channel responses HSW and HSN obtained in the wide-band filter 43 and the narrow-band filter 44, due to an interference factor, such as noise or fading.

The carrier interpolating section 53 performs interpolation between carriers with respect to the channel response HSW, and outputs the resultant interpolated channel response HCW to the division section 61. The carrier interpolating section 54 performs interpolation between carriers with respect to the channel response HSN, and outputs the resultant interpolated channel response HCN to the division section 62.

The two channel responses HCW and HCN obtained in the channel estimation section 220 have different estimation precisions, depending on the situation of interference (noise, fading). Therefore, the demodulated signals XCW and XCN obtained based on these channel responses in the equalization section 60 also have different quality levels, depending on the interference situation.

As described above, also in the second embodiment of the present invention, the quality value of each signal can be calculated from the two demodulated signals XCW and XCN which have different quality levels, depending on the interference situation, and based on the calculated quality values, a demodulated signal having a higher level of quality can be selected.

Although, in the second embodiment of the present invention, the symbol interpolating section 40 is assumed to have two filters, the number of filters may be three or more. Also in such a case, waveform equalization may be performed with respect to a channel response obtained for each filter, and a demodulated signal having a highest level of quality may be selected from the resultant demodulated signals. Therefore, the quality precision of a demodulated signal can be more flexibly selected, depending on an interference situation, thereby making it possible to improve the reception performance of the OFDM reception apparatus.

Figure 10:
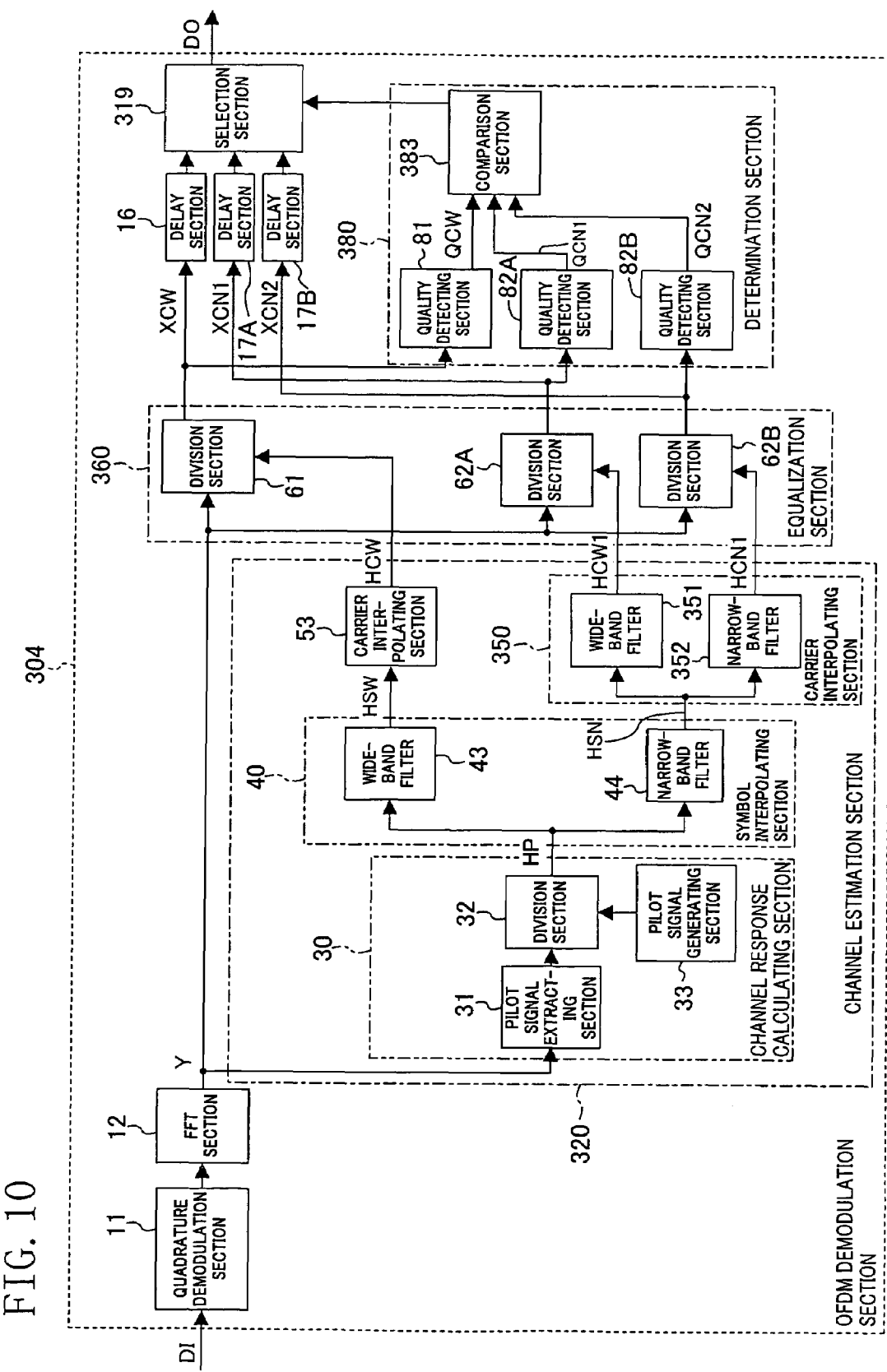
FIG. 10 is a block diagram illustrating a structure of an OFDM demodulation section according to a variation of the second embodiment of the present invention.

FIG. 10 is a block diagram illustrating a structure of an OFDM demodulation section according to a variation of the second embodiment of the present invention. The OFDM demodulation section 304 of FIG. 10 comprises a channel estimation section 320, an equalization section 360, a determination section 380, a the delay section 17A, and a selection section 319 instead of the channel estimation section 220, the equalization section 60, the determination section 80, the delay section 17, and the selection section 19 of the OFDM demodulation section 204 of FIG. 9, and further, a the delay section 17B.

The channel estimation section 320 comprises a carrier interpolating section 350 instead of the carrier interpolating section 54 in the channel estimation section 220. The carrier interpolating section 350 has a wide-band filter 351 and a narrow-band filter 352 as carrier interpolating filters. The wide-band filter 351 and the narrow-band filter 352 are similar to the wide-band filter 51 and the narrow-band filter 52 of FIG. 2, respectively. The equalization section 360 comprises division sections 61, 62A, and 62B. The determination section 380 comprises quality detecting sections 81, 82A, and 82B, and a comparator 383.

The wide-band filter 351 and the narrow-band filter 352 subject the channel response HSN supplied from the symbol interpolating section 42 to carrier-direction filtering to perform interpolation between carriers. The wide-band filter 351 outputs a resultant channel response HCW1 to the division section 62A, and the narrow-band filter 352 outputs a resultant channel response HCN1 to the division section 62B.

The division section 62A divides the frequency-domain OFDM signal Y supplied from the FFT section 12 by the channel response HCW1, and outputs a resultant demodulated signal XCN1 to the delay section 17A and the quality detecting section 82A. The division section 62B divides the frequency-domain OFDM signal Y supplied from the FFT section 12 by the channel response HCN1, and outputs a resultant demodulated signal XCN2 to the delay section 17B and the quality detecting section 82B.

The quality detecting section 82A detects a quality value QCN1 of the demodulated signal XCN1, and outputs the detection result to the comparator 383. The quality detecting section 82B detects a quality value QCN2 of the demodulated signal XCN2, and outputs the detection result to the comparator 383. The comparator 383 compares the quality values QCW, QCN1, and QCN2 to select a value having a highest level of quality, and outputs the determination result to the selection section 319.

The delay sections 17A and 17B are similar to the delay section 16, and delay the demodulated signals XCN1 and XCN2, respectively, and output the delayed signals to the selection section 319. The selection section 319 selects one of the demodulated signals XCW, XCN1, and XCN2 which has best quality in accordance with the determination result output from the determination section 380, and outputs the selection result as a demodulated signal DO to the error correction section 5.

According to the OFDM demodulation section 304 of FIG. 10, one can be selected from a larger number of demodulated signals, depending on a situation, such as noise interference, multipath interference, fading interference, or the like, thereby making it possible to further improve reception performance. For example, it is assumed that the carrier interpolating sections 53 and 54 of the OFDM demodulation section 204 of FIG. 9 and the carrier interpolating sections 53 of the OFDM demodulation section 304 of FIG. 10 each have a filter having the same characteristics as those of the wide-band filter 351. In this case, when only noise interference is present in a received signal, the OFDM demodulation section 304 can obtain the channel response HCN1 which has a smaller amount of overlapping noise than that of any of the other channel responses HCW, HCN, and HCW1. Therefore, reception performance can be improved under environment of noise interference, as compared to the OFDM demodulation section 204.

Note that the OFDM demodulation section of FIG. 10 may comprise the carrier interpolating section 350 instead of the carrier interpolating section 53. Specifically, four channel responses may be calculated, waveform equalization may be performed based on each channel response to obtain four demodulated signals, and one which has a highest level of quality may be selected from the four demodulated signals.

Third Embodiment

Figure 11:
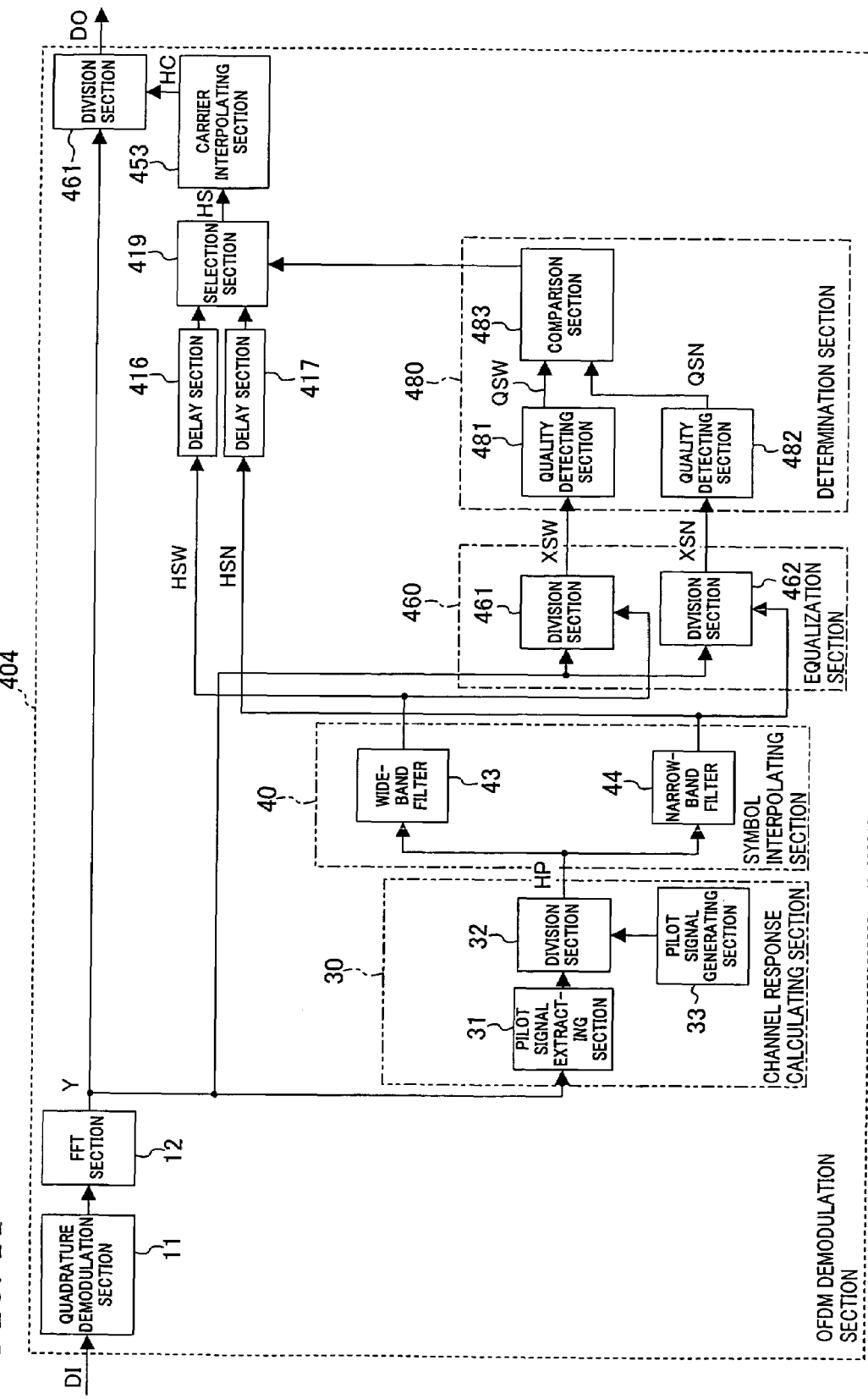
FIG. 11 is a block diagram illustrating an exemplary structure of an OFDM demodulation section according to a third embodiment of the present invention.

FIG. 11 is a block diagram illustrating an exemplary structure of an OFDM demodulation section 404 according to a third embodiment of the present invention. In the third embodiment, the OFDM demodulation section 404 is used instead of the OFDM demodulation section 4 in the OFDM reception apparatus of FIG. 1.

The OFDM demodulation section 404 of FIG. 11 comprises a quadrature demodulation section 11, an FFT section 12, a channel response calculating section 30, a symbol interpolating section 40, an equalization section 460, a determination section 480, delay sections 416 and 417, a selection section 419, a carrier interpolating section 453, and a division section 463. The same components as those described with reference to FIGS. 2 and 9 are indicated with the same reference numerals and will not be explained.

The equalization section 460 comprises division sections 461 and 462. The division section 461 divides the frequency-domain OFDM signal Y supplied from the FFT section 12 by the channel response HSW output from the wide-band filter 43, and outputs a resultant demodulated signal XSW to a quality detecting section 481. The division section 462 divides the frequency-domain OFDM signal Y supplied from the FFT section 12 by the channel response HSN output from the narrow-band filter 44, and outputs a resultant demodulated signal XSN to a quality detecting section 482.

The two channel responses HSW and HSN obtained in the symbol interpolating section 40 have different estimation precisions, depending on an interference (noise, fading) situation. Therefore, the demodulated signals XSW and XSN obtained in the respective division sections 461 and 462 based on the channel responses also have different quality levels, depending on the interference situation. Note that the channel responses HSW and HSN obtained in the symbol interpolating section 40 are obtained at the positions indicated by symbol CT of carriers on which a pilot signal is transmitted (FIG. 4), and the demodulated signals XSW and XSN obtained in the equalization section 460 are also obtained at the same positions as these positions.

The determination section 480 comprises the quality detecting sections 481 and 482, and a comparison section 483. These components have a similar configuration to that of the determination section 80 of FIG. 2. The determination section 480 determines one of the demodulated signals XSW and XSN which has a higher level of quality (better quality). The quality detecting section 481 detects a quality value QSW of the demodulated signal XSW, and outputs the detection result to the comparison section 483. The quality detecting section 482 detects a quality value QSN of the demodulated signal XSN, and outputs the detection result to the comparison section 483. The comparison section 483 determines one of the quality value QSW and the quality value QSN which has a higher level of quality, and outputs the determination result to the selection section 419.

According to the thus-constructed determination section 480, the quality values QSW and QSN of a signal are calculated from the two demodulated signals XSW and XSN which have different quality levels, depending on an interference situation, and based on a result of comparison of the calculated quality values QSW and QSN, a channel response having a higher level of estimation precision can be determined.

The delay sections 416 and 417 delay the channel responses HSW and HSN, respectively, and output the results to the selection section 419. The selection section 419 selects one of the channel response HSW and HSN which has better quality in accordance with the determination result output from the determination section 480, and outputs the selected channel response HS to the carrier interpolating section 453.

Here, the delay sections 416 and 417 delay the channel response HSW and HSN by a time required for processes in the equalization section 460 and the determination section 480, respectively, for example. As a result, a difference is removed between timing of inputting the channel responses HSW and HSN to the selection section 419 and timing of inputting the determination result of the determination section 480 with respect to these channel responses to the selection section 419. Therefore, even when a change occurs in the situation of the estimation precision of the two channel responses HSW and HSN output from the symbol interpolating section 40, the OFDM demodulation section 404 can follow the change quickly.

Note that the delay sections 416 and 417 may not be provided. In this case, circuit cost required for the delay sections 416 and 417 can be reduced.

The carrier interpolating section 453 subjects the channel response HS selected in the selection section 419 to carrier-direction filtering, thereby performing interpolation between carriers. The carrier interpolating section 453 outputs an interpolated channel response HC to the division section 463. As illustrated in FIG. 5, the interpolated channel response HC is obtained at the positions indicated with symbol CF.

The division section 463 divides the frequency-domain OFDM signal Y supplied from the FFT section 12 by the channel response HC, and outputs a resultant demodulated signal DO. In other words, the division section 463 compensates for waveform distortion occurring in a transmission channel due to multipath by performing waveform equalization with respect to the frequency-domain OFDM signal Y.

According to the third embodiment of the present invention, an appropriate one is selected from channel responses before carrier interpolation, thereby making it possible to suppress the computation amount of the determination section.

Fourth Embodiment

Figure 12:
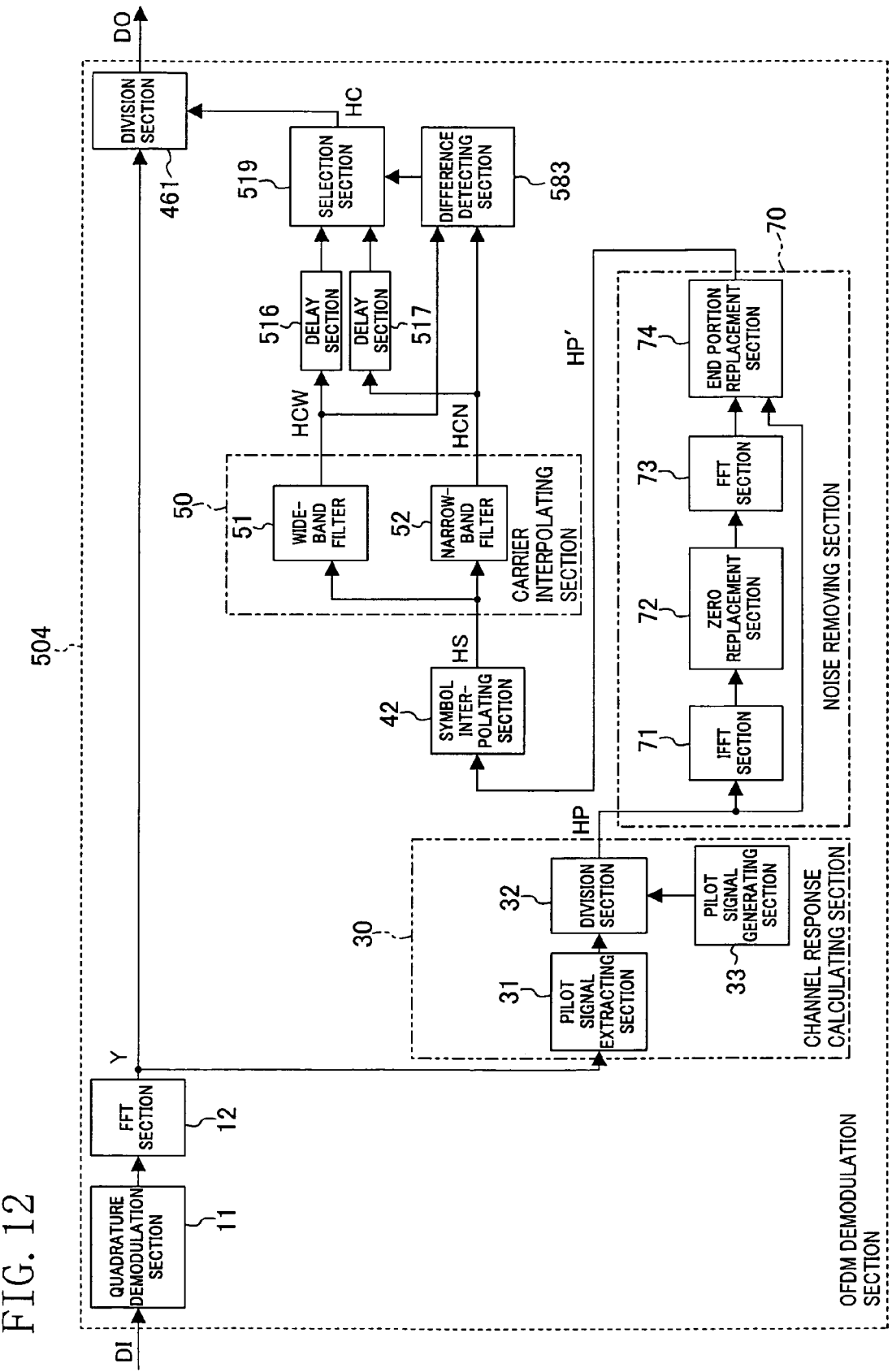
FIG. 12 is a block diagram illustrating an exemplary structure of an OFDM demodulation section according to a fourth embodiment of the present invention.

FIG. 12 is a block diagram illustrating an exemplary structure of an OFDM demodulation section 504 according to a fourth embodiment of the present invention. The OFDM demodulation section 50 comprises a quadrature demodulation section 11, an FFT section 12, a channel response calculating section 30, a symbol interpolating section 42, a carrier interpolating section 50, a noise removing section 70, a difference detecting section 583, delay sections 516 and 517, a selection section 519, and a division section 461. The quadrature demodulation section 11, the FFT section 12, the channel response calculating section 30, the symbol interpolating section 42, and the carrier interpolating section 50 are similar to those which have been described with reference to FIG. 2 and will not be explained in detail.

The noise removing section 70 subjects a channel response HP to IFFT to calculate an impulse response, and based on the impulse response, removes a noise component overlapping the channel response HP, and outputs the noise-removed channel response HP' to the symbol interpolating section 42. The noise removing section 70 comprises an IFFT section 71, a zero replacement section 72, an FFT section 73, and an end portion replacement section 74.

Figure 13:
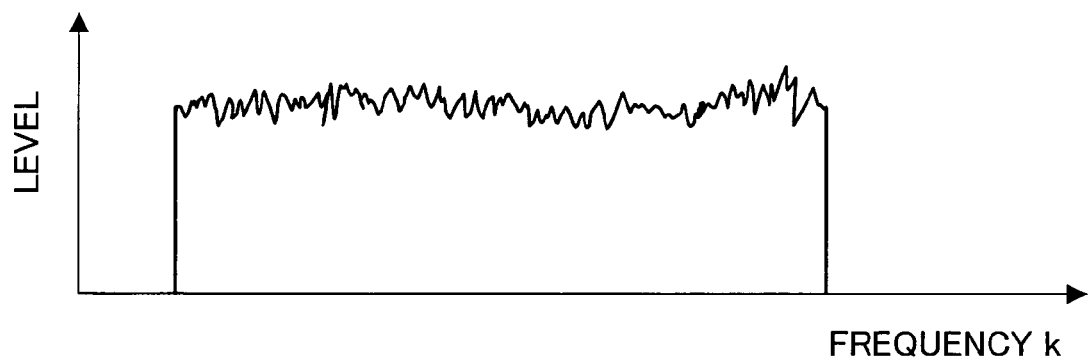
FIG. 13 is a schematic diagram illustrating an example of a magnitude |HP| of a channel response with respect to a pilot carrier of a received OFDM signal when noise overlaps the OFDM signal.

FIG. 13 is a schematic diagram illustrating an example of a magnitude |HP| of a channel response with respect to a pilot carrier of a received OFDM signal when noise overlaps the OFDM signal. The magnitude |HP| of a channel response is ideally constant, however, in FIG. 13, distortion occurs therein over an entire band.

The IFFT section 71 performs IFFT with respect to the channel response HP obtained in the channel response calculating section 30 for each symbol to convert the channel response HP from a frequency-domain signal to a time-domain signal, and outputs the resultant time-domain signal, i.e., an impulse response, to the zero replacement section 72. The impulse response is obtained in the form of a complex signal (vector) having a component in each of the I- and Q-axis directions.

Figure 14:
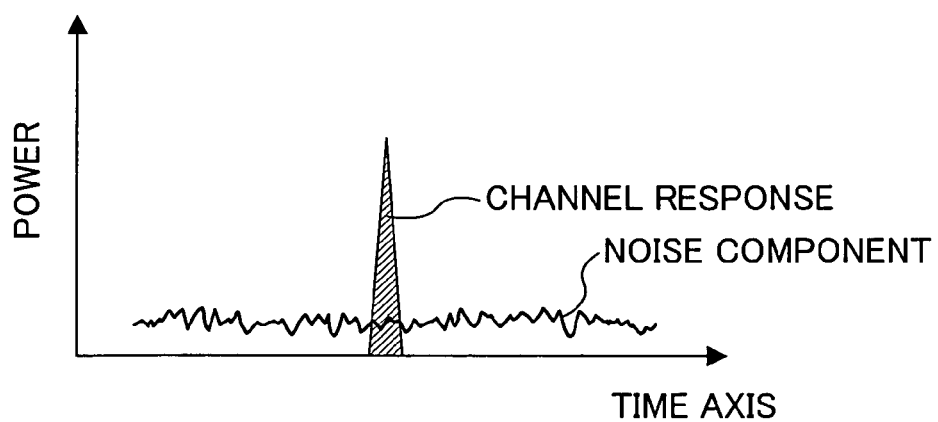
FIG. 14 is a diagram illustrating a level of an impulse response obtained in an IFFT section of FIG. 12.

FIG. 14 is a diagram illustrating a level (a square of a magnitude) of an impulse response obtained in the IFFT section 71 of FIG. 12. As can be seen from FIG. 14, the channel response level has a local peak, however, noise components are distributed over an entire region on the time axis. The zero replacement section 72 removes noise components from the impulse response.

Figure 15:
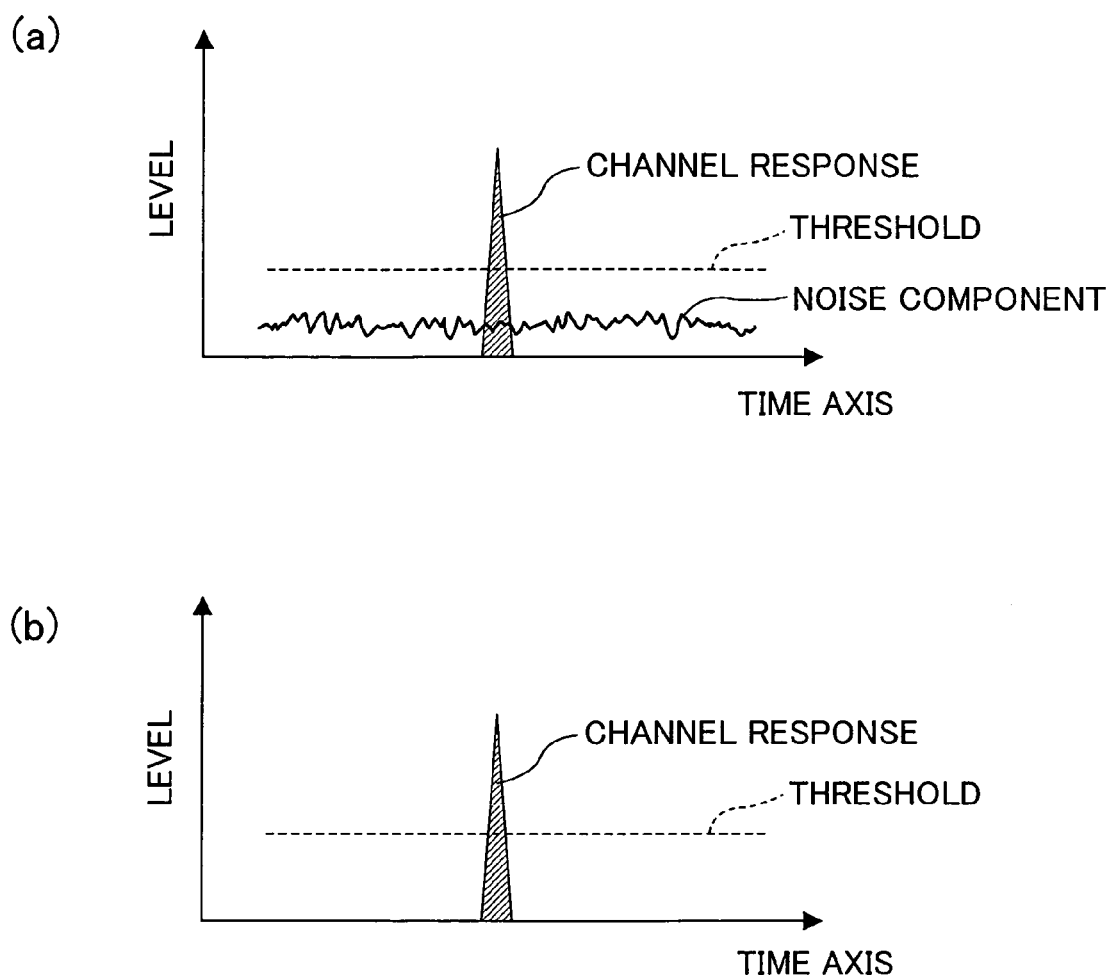
FIGS. 15(a) and 15(b) are diagrams illustrating impulse responses before and after removal of noise components, respectively.

FIGS. 15(a) and 15(b) are diagrams illustrating impulse responses before and after removal of noise components, respectively. As illustrated in FIG. 15(a), the zero replacement section 72 sets a threshold to be a predetermined level.

The zero replacement section 72 calculates a sum of a sqare value of an I-axis component and a square value of an Q-axis component of an impulse response output from the IFFT section 71 as a power of the impulse response, compares the impulse response power with the set threshold, replaces an impulse response having a power smaller than the threshold with "0 vector", and outputs an impulse response having a power no smaller than the threshold, as it is, to the FFT section 73. The zero replacement section 72 outputs the replaced impulse response as illustrated in FIG. 15(b).

Figure 16:
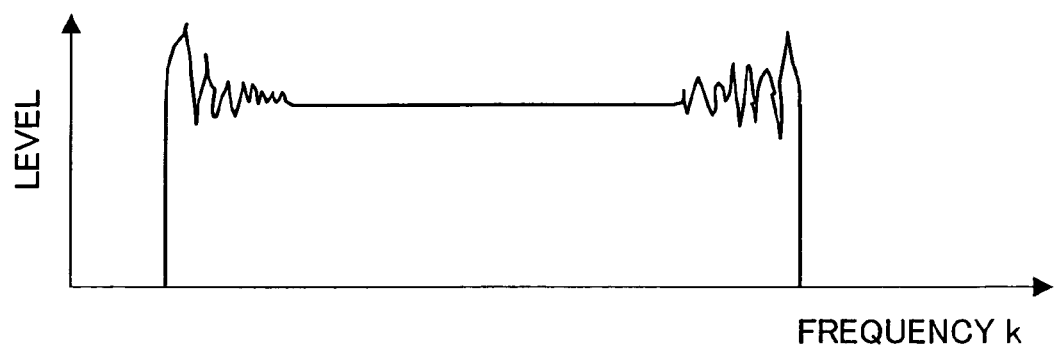
FIG. 16 is a diagram illustrating a channel response obtained in an FFT section of FIG. 12.

The FFT section 73 subjects the noise component-removed impulse response to FFT to convert it back into a frequency-domain signal, and outputs the resultant signal to the end portion replacement section 74. FIG. 16 is a diagram illustrating a channel response obtained in the FFT section 73 of FIG. 12. As illustrated in FIG. 16, an influence of truncation of data may deteriorate characteristics of a band at its both end portions. The end portion replacement section 74 is provided so as to bypass the above-described noise removing process for the purpose of avoding the deterioration of the characteristics of the both band end portions.

The end portion replacement section 74 outputs a channel response within a predetermined frequency band including a middle portion of a band, as it is, among the channel responses output from the FFT section 73, and replaces channel responses in the vicinity of bands other than the frequency band, i.e., the band end portions having a significant deterioration in characteristics (a low band portion and a high band portion), with a channel response HP before removal of a noise component. The end portion replacement section 74 outputs the resultant channel response HP' to the symbol interpolating section 42. In this case, noise is removed from the channel response HP' of the middle portion of a band which has not been subjected to replacement, while noise is not removed from the channel response HP' of the band end portions which has been subjected to replacement.

Figure 17:
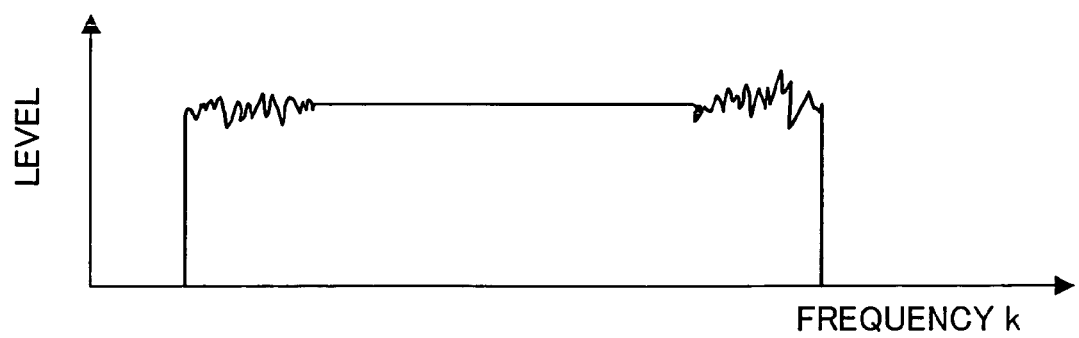
FIG. 17 is a diagram illustrating a channel response HP' obtained in a noise removing section of FIG. 12.

FIG. 17 is a diagram illustrating the channel response HP' obtained in the noise removing section 70 of FIG. 12. As illustrated in FIG. 17, an influence of noise is removed from the middle portion of a band, while noise is not removed and remains at both the band end portions.

Note that, in the noise removing section 70, in order to reduce the influence of truncation, the channel response HP may be multiplied by an appropriate window function before IFFT, or alternatively, a channel response obtained in the FFT section 73 may be divided by the window function.

The symbol interpolating section 42 subjects the noise-removed channel response HP' to intersymbol filtering to perform symbol-direction interpolation, and outputs a symbol-interpolated channel response HS to the wide-band filter 51 and the narrow-band filter 52 of the carrier interpolating section 50. The wide-band filter 51 and the narrow-band filter 52 calculate channel responses HCW and HCN, respectively. The wide-band filter 51 outputs the resultant channel response HCW to the delay section 516 and the difference detecting section 583, and the narrow-band filter 52 outputs the resultant channel response HCN to the delay section 517 and the difference detecting section 583.

In the channel response HS obtained by symbol-direction interpolation of an output of the noise removing section 70, noise is removed from the middle portion of the band. Therefore, in the channel responses HCW and HCN obtained in the wide-band filter 51 and the narrow-band filter 52, respectively, under environment of noise interference, there is substantially no difference between the middle portions thereof due to an influence of noise.

On the other hand, under environment in which multipath interference is present, particularly when a delay time exceeds the pass band width of the narrow-band filter 52, a difference occurs between the channel responses HCW and HCN (FIGS. 7(a) and 7(b)). In such a case, whereas the wide-band filter 51 obtains a correct channel response, the narrow-band filter 52 does not obtain a correct channel response. Therefore, a significant difference occurs between the channel responses HCW and the channel response HCN obtained in the wide-band filter 51 and the narrow-band filter 52, respectively.

As has already been described, the wider the pass band width of a filter for carrier interpolation, the longer the delay time of a delayed wave which can be estimated. In this case, however, a larger amount of noise overlaps the estimated channel response.

Therefore, the difference detecting section 583 detects the presence or absence of a difference between the channel response HCW and the channel response HCN in the band middle portion (or a part thereof) (or that a value of the difference exceeds a predetermined range), and outputs the detection result to the selection section 519.

In order to detect a difference in the difference detecting section 583, a difference value between I-axis components and a difference value between Q-axis components may be calculated with respect to the channel response HCW and the channel response HCN of the band middle portion, a sum of squares of these difference values may be calculated as a difference power for each carrier, and it may be determined whether or not a highest value of the difference power exceeds a predetermined value. Alternatively, a magnitude of the difference power between the channel response HCW and the channel response HCN of the band middle portion may be accumulated over all carriers belonging to the band middle portion, and it may be determined whether or not a result of the accumulation exceeds a predetermined value. Note that, in the difference detecting section 583, the difference detection may be performed in the whole or a part of the band middle portion.

The delay sections 516 and 517 delay the channel responses HCW and HCN, respectively, and output the results to the selection section 519. The selection section 519 selects one of the channel responses HCW and HCN based on the detection result output from the difference detecting section 583, and outputs the selected channel response HC to the division section 461.

Specifically, when there is not a difference between the channel response HCW and the channel response HCN of the band middle portion (or a value of the difference falls within a predetermined range), the channel response HCN obtained by the narrow-band filter 52 which has a high level of effect of suppressing noise is selected, and is output as the channel response HC for the entire band. As a result, a channel response in which the influence of noise is reduced at the both end portions can be obtained.

On the other hand, when there is a difference between the channel responses HCW and HCN of the band middle portion (or the value of the difference exceeds a predetermined range), the channel response HCW obtained by the wide-band filter 51 which has a high level of estimation precision in a multipath transmission channel is selected as a channel response at the band end portions, and is output as the channel response HC for the entire band. As a result, it is possible to obtain a channel response which has an improved level of estimation precision of a multipath transmission channel.

Here, for example, the delay sections 516 and 517 delay the channel responses HCW and HCN, respectively, by a time required for the process of the difference detecting section 583. As a result, a difference is removed between timing of inputting the channel responses HCW and HCN to the selection section 519 and timing of inputting the detection result of the difference detecting section 583 with respect to these channel responses to the selection section 519. Therefore, even when a change occurs in the situation of the estimation precision of the two channel responses HCW and HCN output from the carrier interpolating section 50, the OFDM demodulation section 504 can follow the change quickly.

The division section 461 divides the frequency-domain OFDM signal Y by the channel response HC to perform waveform equalization with respect to the frequency-domain OFDM signal Y. Thereby, the division section 461 compensates for waveform distortion occurring in a transmission channel due to multipath interference, and outputs a resultant demodulated signal DO.

The thus-obtained channel response HC for the entire band is obtained by appropriate selection from outputs of a plurality of filters used in channel estimation, under environment in which noise interference or multipath interference is present. Therefore, the estimation precision of the transmission channel is high, and by using the channel response to perform waveform equalization, reception performance can be improved. In addition, the selection from the outputs of a plurality of filters can be performed for each symbol, so that the ability to follow is considerably excellent under environment in which a channel response varies.

Note that the delay sections 516 and 517 may not be provided. In this case, circuit cost required for the delay sections 516 and 517 can be reduced.

In addition, the selection section 519 may select one of the channel responses HCW and HCN as a channel response for the entire band, when the selection is performed based on the detection result of a difference between the channel response HCW and the channel response HCN in the band middle portion. Alternatively, the channel response HCW may be invariably selected for the band middle portion, while one of the channel responses HCW and HCN may be selected only for the band end portions. As has already been described, the influence of noise is removed from the channel response of the band middle portion, and therefore, the channel response HCW can be invariably used for the band middle portion without a problem.

When the selection is performed only for the band end portions, any one of the channel responses may be selected only for one of the end portions, e.g., a high-band end portion. In this case, the hardware amount of delayers in the delay sections 516 and 517 can be reduced.

Figure 18:
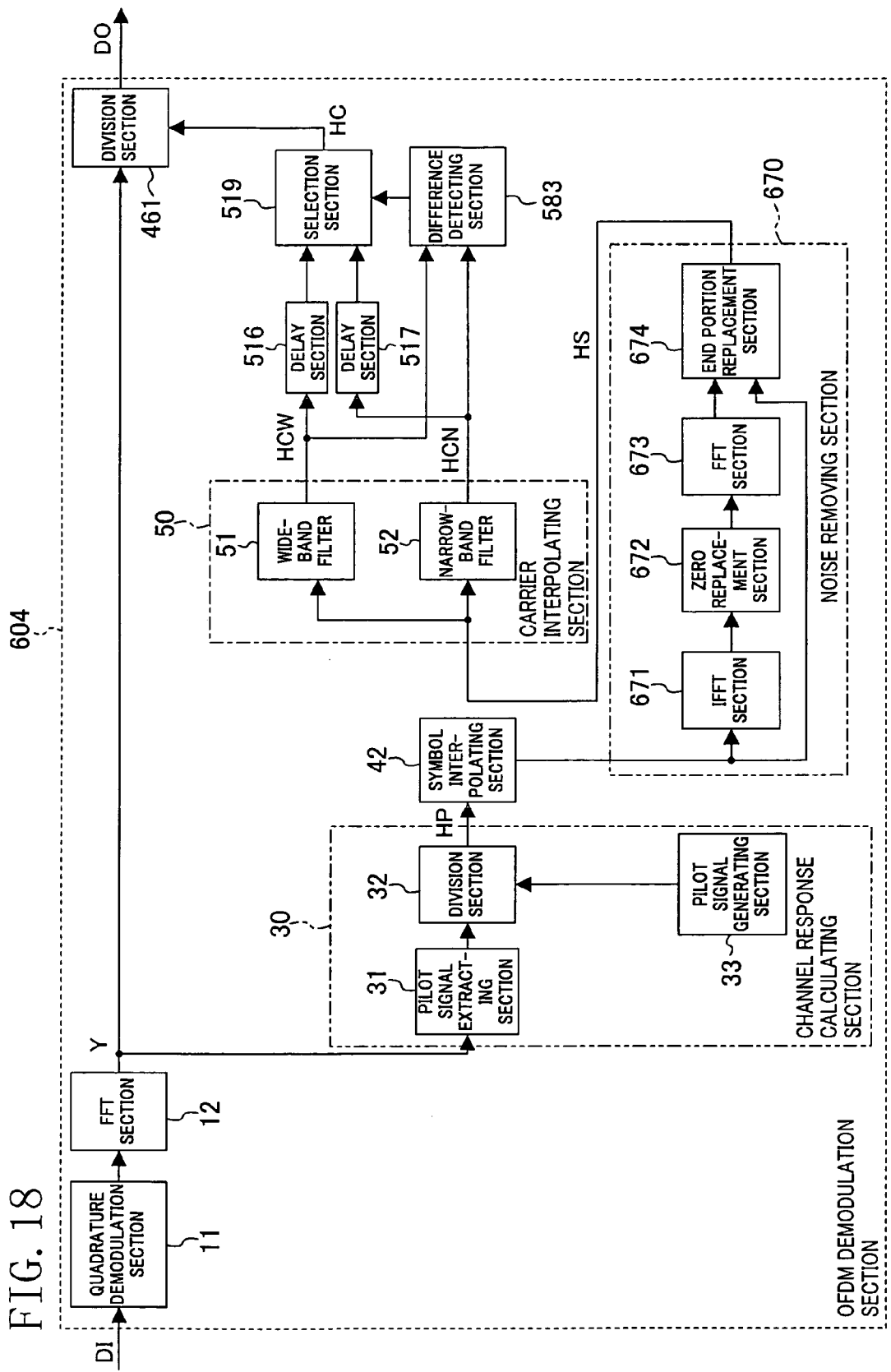
FIG. 18 is a block diagram illustrating a structure of an OFDM demodulation section according to a variation of the fourth embodiment of the present invention.

FIG. 18 is a block diagram illustrating a structure of an OFDM demodulation section 604 according to a variation of the fourth embodiment of the present invention. The OFDM demodulation section 604 comprises a noise removing section 670 instead of the noise removing section 70 in the OFDM demodulation section 504 of FIG. 12 so that a noise removing process is performed after a symbol interpolation process.

The symbol interpolating section 42 subjects the channel response HP obtained by the channel response calculating section 30 to intersymbol filtering to perform symbol-direction interpolation, and outputs the symbol-interpolated channel response to the noise removing section 670.

The noise removing section 670 comprises an IFFT section 671, a zero replacement section 672, an FFT section 673, and an end portion replacement section 674, which have substantially the same configuration as that of the noise removing section 70 of FIG. 12. The noise removing section 670 removes a noise component overlapping a channel response output from the symbol interpolating section 42, and outputs a noise-removed channel response HS to the wide-band filter 51 and the narrow-band filter 52, as in the noise removing section 70.

Thus, when symbol-direction interpolation is performed before a noise removing process, noise can be removed from the band middle portion.

Although, in the above-described embodiments of the present invention, the symbol interpolating section or the carrier interpolating section is assumed to have two filters having different characteristics, the number of filters may be three or more. Also in such a case, waveform equalization may be performed with respect to a channel response obtained for each filter, and a demodulated signal having a highest level of quality may be selected from the resultant demodulated signals. Therefore, the quality precision of a demodulated signal can be more flexibly selected, depending on an interference situation, thereby making it possible to improve the reception performance of the OFDM reception apparatus.

INDUSTRIAL APPLICABILITY

As described above, according to the present invention, channel estimation precision can be adaptively enhanced or the quality of a demodulated signal can be improved, without being affected by interference conditions of a transmission channel, such as Gaussian noise, multipath, or the like, and without depending on a guard interval. Therefore, the present invention is useful as, for example, an OFDM reception apparatus of receicing an OFDM signal of digital broadcasting, wireless LAN, or the like.

The invention claimed is:

1. An OFDM reception apparatus for receiving and demodulating an OFDM (Orthogonal Frequency Division Multiplexing) signal which transmits a pilot signal whose amplitude and phase are known, the apparatus comprising:
a channel estimation section for calculating a channel response before interpolation by performing computation between a frequency-domain OFDM signal obtained by Fourier-transforming the received OFDM signal and the pilot signal, performing interpolation with respect to the before-interpolation channel response using a plurality of filters having different characteristics from each other, and outputting a plurality of interpolated channel responses based on respective results of the interpolation obtained by the plurality of filters;
an equalization section for performing waveform equalization with respect to the frequency-domain OFDM signal based on the plurality of interpolated channel responses, and outputting a plurality of demodulated signals based on respective results of the waveform equalization corresponding to the plurality of interpolated channel responses;
a determination section for determining one having best quality from the plurality of demodulated signals, and outputting a result of the determination; and
a selection section for selecting and outputting one of the plurality of demodulated signals in accordance with the determination result.

2. The OFDM reception apparatus of claim 1, wherein the channel estimation section comprises:
a channel response calculating section for calculating the before-interpolation channel response by performing computation between the frequency-domain OFDM signal and the pilot signal;

a symbol interpolating section for performing symbol-direction interpolation with respect to the before-interpolation channel response, and outputting a symbol-direction-interpolated channel response; and a carrier interpolating section having a plurality of carrier interpolating filters having different pass bands from each other, and for performing carrier-direction interpolation with respect to the symbol-direction-interpolated channel response using each of the plurality of carrier interpolating filters, and outputting a result of the carrier-direction interpolation as the plurality of interpolated channel responses.

3. The OFDM reception apparatus of claim 1, wherein the channel estimation section comprises:

a channel response calculating section for calculating the before-interpolation channel response by performing computation between the frequency-domain OFDM signal and the pilot signal;

a symbol interpolating section having a plurality of filters having different pass bands from each other, and for performing symbol-direction interpolation with respect to the before-interpolation channel response using each of the plurality of filters, and outputting a result of the symbol-direction interpolation as a plurality of symbol-direction-interpolated channel responses; and a plurality of carrier interpolating sections corresponding to the plurality of symbol-direction-interpolated channel responses, respectively, wherein the plurality of carrier interpolating sections perform carrier-direction interpolation with respect to the respective corresponding symbol-direction-interpolated channel responses, and based on a result of the carrier-direction interpolation, outputting the plurality of interpolated channel responses.

4. The OFDM reception apparatus of claim 3, wherein at least one of the plurality of carrier interpolating sections has a plurality of carrier interpolating filters having different pass bands from each other, and performs carrier-direction interpolation with respect to the symbol-direction-interpolated channel response corresponding to the carrier interpolating section, using each of the plurality of carrier interpolating filter of the carrier interpolating section.

5. The OFDM reception apparatus of claim 1, further comprising:

a plurality of delay sections corresponding to the plurality of demodulated signals output from the equalization section, respectively, and for delaying the respective corresponding demodulated signals and outputting the delayed demodulated signals to the selection section, wherein each of the plurality of delay sections delays the corresponding demodulated signal so that timing with which the selection section obtains the determination result coincides with timing with which the selection section obtains the delayed demodulated signal.

6. The OFDM reception apparatus of claim 1, wherein the determination section comprises:

a plurality of quality detecting sections corresponding to the plurality of demodulated signals obtained in the equalization section, respectively, and for obtaining quality values of the respective corresponding demodulated signals; and a comparison section for performing determination based on the quality values obtained by the plurality of quality detecting sections, wherein each of the plurality of quality detecting sections performs hard decision with respect to the corresponding demodulated signal to obtain a reference signal point, obtains a distance between the obtained reference signal point and a signal point before the hard decision for each carrier constituting the corresponding demodulated signal, and outputs a value corresponding to an average value obtained by averaging the obtained distances for a plurality of carriers constituting the corresponding demodulated signal.

7. An OFDM reception apparatus for receiving and demodulating an OFDM signal which transmits a pilot signal whose amplitude and phase are known, the apparatus comprising:

a channel response calculating section for calculating a channel response before interpolation by performing computation between a frequency-domain OFDM signal obtained by Fourier-transforming the received OFDM signal and the pilot signal;

a symbol interpolating section having a plurality of filters having different pass bands from each other, and for performing symbol-direction interpolation with respect to the before-interpolation channel response using each of the plurality of filters, and outputting a result of the symbol-direction interpolation as a plurality of symbol-direction-interpolated channel responses;

an equalization section for performing waveform equalization with respect to the frequency-domain OFDM signal based on the plurality of symbol-direction-interpolated channel responses, and outputting a plurality of demodulated signals based on a result of the waveform equalization;

a determination section for determining one having best quality from the plurality of demodulated signals, and outputting a result of the determination;

a selection section for selecting and outputting one of the plurality of symbol-direction-interpolated channel responses in accordance with the determination result;

a carrier interpolating section for performing carrier-direction interpolation with respect to the channel response selected by the selection section, and outputting the carrier-direction-interpolated channel response; and a division section for performing division with respect to the frequency-domain OFDM signal based on the carrier-direction-interpolated channel response, and outputting a result of the division as a demodulated signal.

8. The OFDM reception apparatus of claim 7, further comprising:

a plurality of delay sections corresponding to the plurality of symbol-direction-interpolated channel responses, respectively, and for delaying the respective corresponding channel responses and outputting the delayed channel responses to the selection section, wherein each of the plurality of delay sections delays the corresponding channel response so that timing with which the selection section obtains the determination result coincides with timing with which the selection section obtains the delayed channel response.

9. The OFDM reception apparatus of claim 7, wherein the determination section comprises:

a plurality of quality detecting sections corresponding to the plurality of demodulated signals obtained in the equalization section, respectively, and for obtaining quality values of the respective corresponding demodulated signals; and a comparison section for performing determination based on the quality values obtained by the plurality of quality detecting sections, wherein each of the plurality of quality detecting sections performs hard decision with respect to the corresponding demodulated signal to obtain a reference signal point, obtains a distance between the obtained reference signal point and a signal point before the hard decision for each carrier constituting the corresponding demodulated signal, and outputs a value corresponding to an average value obtained by averaging the obtained distances for a plurality of carriers constituting the corresponding demodulated signal.

10. An OFDM reception apparatus for receiving and demodulating an OFDM signal which transmits a pilot signal whose amplitude and phase are known, the apparatus comprising:

a channel response calculating section for calculating a channel response before interpolation by performing computation between a frequency-domain OFDM signal obtained by Fourier-transforming the received OFDM signal and the pilot signal;

a noise removing section for removing noise in a predetermined frequency band from the before-interpolation channel response, and outputting a resultant noise-removed channel response;

a symbol interpolating section for performing symbol-direction interpolation with respect to the noise-removed channel response, and outputting a symbol-direction-interpolated channel response;

a carrier interpolating section having a plurality of carrier interpolating filters having different pass bands from each other, and for performing carrier-direction interpolation with respect to the symbol-direction-interpolated channel response using each of the plurality of carrier interpolating filters, and outputting a result of the carrier-direction interpolation as a plurality of carrier-direction-interpolated channel responses;

a difference detecting section for detecting a difference between the plurality of carrier-direction-interpolated channel responses in the predetermined frequency band or a portion thereof;

a selection section for selecting and outputting one of the plurality of carrier-direction-interpolated channel responses in accordance with a result of the detection of the difference detecting section; and a division section for performing division with respect to the frequency-domain OFDM signal based on the channel response selected by the selection section, and outputting a result of the division as a demodulated signal.

11. The OFDM reception apparatus of claim 10, wherein the noise removing section comprises:

an inverse Fourier transform section for subjecting an input channel response to inverse Fourier transform, and outputting a resultant impulse response;

a zero replacement section for replacing one having a magnitude less than a predetermined magnitude among the impulse responses with a 0 vector, and outputting a result of the replacement;

a Fourier transform section for subjecting an output of the zero replacement section to Fourier transform, and outputting a result of the Fourier transform; and an end portion replacement section for outputting, of the output of the Fourier transform section, part within the predetermined frequency band, as it is, and replacing part within a frequency band other than the predetermined frequency band with the channel response input to the inverse Fourier transform section, and outputting a result of the replacement.

12. An OFDM reception apparatus for receiving and demodulating an OFDM signal which transmits a pilot signal whose amplitude and phase are known, the apparatus comprising:

a channel response calculating section for calculating a channel response before interpolation by performing computation between a frequency-domain OFDM signal obtained by Fourier-transforming the received OFDM signal and the pilot signal;

a symbol interpolating section for performing symbol-direction interpolation with respect to the before-interpolation channel response, and outputting a symbol-direction-interpolated channel response;

a noise removing section for removing noise in a predetermined frequency band from the symbol-direction-interpolated channel response, and outputting a resultant noise-removed channel response;

a carrier interpolating section having a plurality of carrier interpolating filters having different pass bands from each other, and for performing carrier-direction interpolation with respect to the noise-removed channel response using each of the plurality of carrier interpolating filters, and outputting a result of the carrier-direction interpolation as a plurality of carrier-direction-interpolated channel responses;

a difference detecting section for detecting a difference between the plurality of carrier-direction-interpolated channel responses in the predetermined frequency band or a portion thereof;

a selection section for selecting and outputting one of the plurality of carrier-direction-interpolated channel responses in accordance with a result of the detection of the difference detecting section; and a division section for performing division with respect to the frequency-domain OFDM signal based on the channel response selected by the selection section, and outputting a result of the division as a demodulated signal.

13. The OFDM reception apparatus of claim 12, wherein the noise removing section comprises:

an inverse Fourier transform section for subjecting an input channel response to inverse Fourier transform, and outputting a resultant impulse response;

a zero replacement section for replacing one having a magnitude less than a predetermined magnitude among the impulse responses with a 0 vector, and outputting a result of the replacement;

a Fourier transform section for subjecting an output of the zero replacement section to Fourier transform and outputting a result of the Fourier transform; and an end portion replacement section for outputting, of the output of the Fourier transform section, part within the predetermined frequency band, as it is, and replacing part within a frequency band other than the predetermined frequency band with the channel response input to the inverse Fourier transform section, and outputting a result of the replacement.

14. An OFDM reception method for receiving and demodulating an OFDM signal which transmits a pilot signal whose amplitude and phase are known, the method comprising:

a channel estimation step of calculating a channel response before interpolation by performing computation between a frequency-domain OFDM signal obtained by Fourier-transforming the received OFDM signal and the pilot signal, performing interpolation with respect to the before-interpolation channel response using a plurality of filters having different characteristics from each other, and obtaining a plurality of interpolated channel responses based on respective results of the interpolation obtained by the plurality of filters;

an equalization step of performing waveform equalization with respect to the frequency-domain OFDM signal based on the plurality of interpolated channel responses, and obtaining a plurality of demodulated signals based on respective results of the waveform equalization corresponding to the plurality of interpolated channel responses;

a determination step of determining one having best quality from the plurality of demodulated signals; and a selection step of selecting one of the plurality of demodulated signals in accordance with a result of the determination.

15. An OFDM reception method for receiving and demodulating an OFDM signal which transmits a pilot signal whose amplitude and phase are known, the method comprising:

a channel response calculating step of calculating a channel response before interpolation by performing computation between a frequency-domain OFDM signal obtained by Fourier-transforming the received OFDM signal and the pilot signal;

a symbol interpolating step of performing symbol-direction interpolation with respect to the before-interpolation channel response using each of a plurality of filters having different pass bands from each other, and obtaining a result of the symbol-direction interpolation as a plurality of symbol-direction-interpolated channel responses;

an equalization step of performing waveform equalization with respect to the frequency-domain OFDM signal based on the plurality of symbol-direction-interpolated channel responses, and obtaining a plurality of demodulated signals based on a result of the waveform equalization;

a determination step of determining one having best quality from the plurality of demodulated signals;

a selection step of selecting one of the plurality of symbol-direction-interpolated channel responses in accordance with a result of the determination;

a carrier interpolating step of performing carrier-direction interpolation with respect to the channel response selected by the selection step, and obtaining the carrier-direction-interpolated channel response; and a division step of performing division with respect to the frequency-domain OFDM signal based on the carrier-direction-interpolated channel response, and obtaining a result of the division as a demodulated signal.

16. An OFDM reception method for receiving and demodulating an OFDM signal which transmits a pilot signal whose amplitude and phase are known, the method comprising:

a channel response calculating step of calculating a channel response before interpolation by performing computation between a frequency-domain OFDM signal obtained by Fourier-transforming the received OFDM signal and the pilot signal;

a noise removing step of removing noise in a predetermined frequency band from the before-interpolation channel response, and obtaining a resultant noise-removed channel response;

a symbol interpolating step of performing symbol-direction interpolation with respect to the noise-removed channel response, and obtaining a symbol-direction-interpolated channel response;

a carrier interpolating step of performing carrier-direction interpolation with respect to the symbol-direction-interpolated channel response using each of a plurality of carrier interpolating filters having different pass bands from each other, and obtaining a result of the carrier-direction interpolation as a plurality of carrier-direction-interpolated channel responses;

a difference detecting step of detecting a difference between the plurality of carrier-direction-interpolated channel responses in the predetermined frequency band or a portion thereof;

a selection step of selecting one of the plurality of carrier-direction-interpolated channel responses in accordance with a result of the detection of the difference detecting step; and a division step of performing division with respect to the frequency-domain OFDM signal based on the channel response selected by the selection step, and obtaining a result of the division as a demodulated signal.

17. An OFDM reception method for receiving and demodulating an OFDM signal which transmits a pilot signal whose amplitude and phase are known, the method comprising:

a channel response calculating step of calculating a channel response before interpolation by performing computation between a frequency-domain OFDM signal obtained by Fourier-transforming the received OFDM signal and the pilot signal;

a symbol interpolating step of performing symbol-direction interpolation with respect to the before-interpolation channel response, and obtaining a symbol-direction-interpolated channel response;

a noise removing step of removing noise in a predetermined frequency band from the symbol-direction-interpolated channel response, and obtaining a resultant noise-removed channel response;

a carrier interpolating step of performing carrier-direction interpolation with respect to the noise-removed channel response using each of a plurality of carrier interpolating filters having different pass bands from each other, and obtaining a result of the carrier-direction interpolation as a plurality of carrier-direction-interpolated channel responses;

a difference detecting step of detecting a difference between the plurality of carrier-direction-interpolated channel responses in the predetermined frequency band or a portion thereof;

a selection step of selecting one of the plurality of carrier-direction-interpolated channel responses in accordance with a result of the detection of the difference detecting step; and a division step of performing division with respect to the frequency-domain OFDM signal based on the channel response selected by the selection step, and obtaining a result of the division as a demodulated signal.

* * * * *